United States Patent
Ding et al.

(10) Patent No.: US 11,668,908 B2
(45) Date of Patent: Jun. 6, 2023

(54) OPTICAL IMAGING SYSTEM

(71) Applicant: Zhejiang Sunny Optical Co., Ltd, Ningbo (CN)

(72) Inventors: Ling Ding, Ningbo (CN); Saifeng Lyu, Ningbo (CN); Fujian Dai, Ningbo (CN); Liefeng Zhao, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 402 days.

(21) Appl. No.: 16/934,128

(22) Filed: Jul. 21, 2020

(65) Prior Publication Data
US 2021/0026112 A1  Jan. 28, 2021

(30) Foreign Application Priority Data
Jul. 24, 2019 (CN) .......................... 201910670576.1

(51) Int. Cl.
*G02B 13/00* (2006.01)
*G02B 9/62* (2006.01)
*G02B 27/00* (2006.01)

(52) U.S. Cl.
CPC ........... *G02B 13/0045* (2013.01); *G02B 9/62* (2013.01); *G02B 27/0025* (2013.01)

(58) Field of Classification Search
CPC ........ G02B 9/62; G02B 9/64; G02B 27/0025; G02B 15/146; G02B 13/0045; H04N 5/222; H04N 5/2254
USPC ......... 359/656–658, 708, 713, 749, 756–762
See application file for complete search history.

(56) References Cited

U.S. PATENT DOCUMENTS

2014/0355134 A1\* 12/2014 Sekine ............... G02B 27/0025
359/713
2015/0253547 A1\* 9/2015 Sun .................... G02B 13/0045
359/713

\* cited by examiner

*Primary Examiner* — Travis S Fissel
(74) *Attorney, Agent, or Firm* — Sughrue Mion, PLLC

(57) ABSTRACT

The present disclosure discloses an optical imaging system which includes, sequentially from an object side to an image side along an optical axis, a first lens having positive refractive power; a second lens having negative refractive power; a third lens having refractive power with an object-side surface being concave and an image-side surface being convex; a fourth lens having refractive power; a fifth lens having positive refractive power with an object-side surface being convex; a sixth lens having negative refractive power with an object-side surface being concave and an image-side surface being concave. An effective focal length f of the optical imaging system and half of a maximum field-of-view angle Semi-FOV of the optical imaging system may satisfy f*tan(Semi-FOV)>4.4 mm.

18 Claims, 14 Drawing Sheets

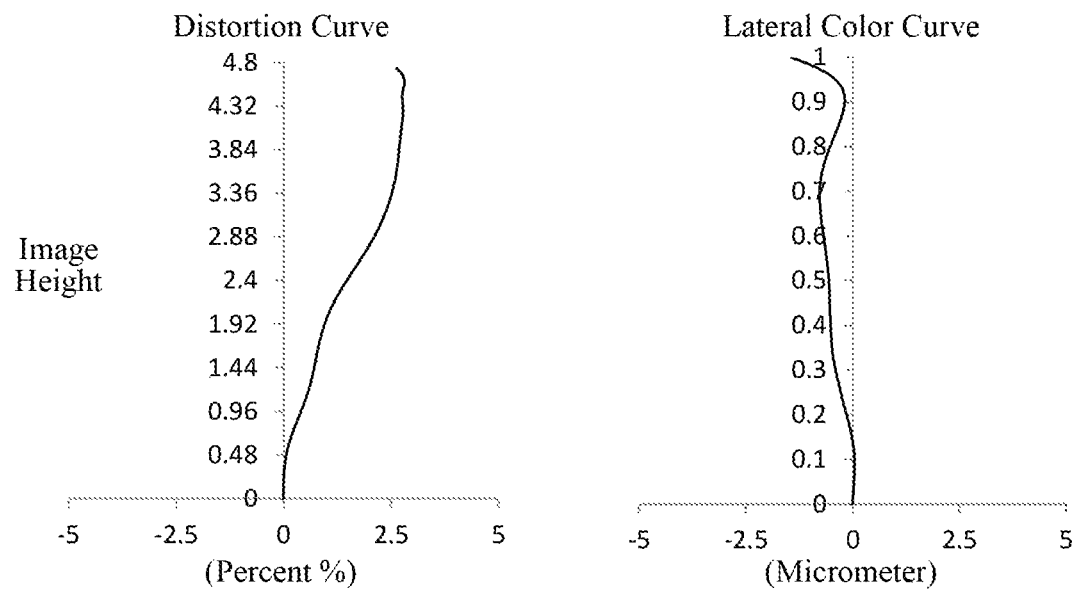
Fig. 2C
Fig. 2D
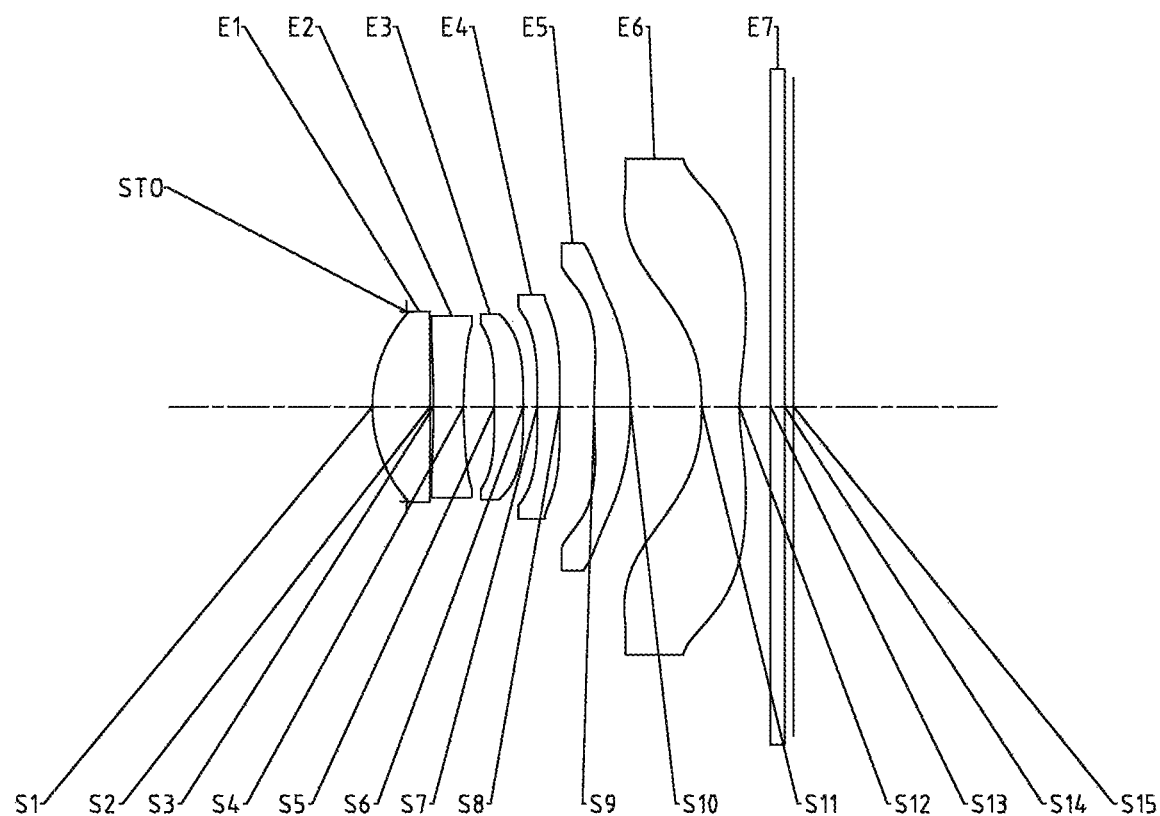
Fig. 3

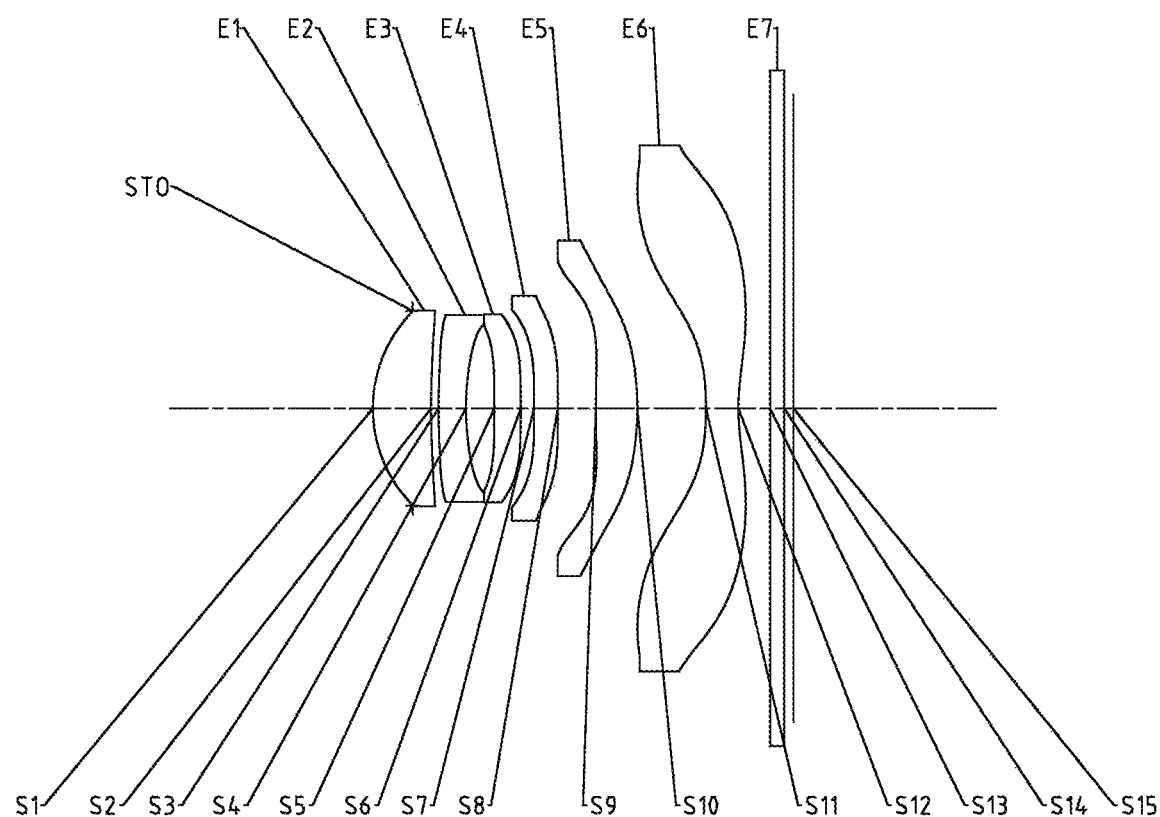
Fig. 5
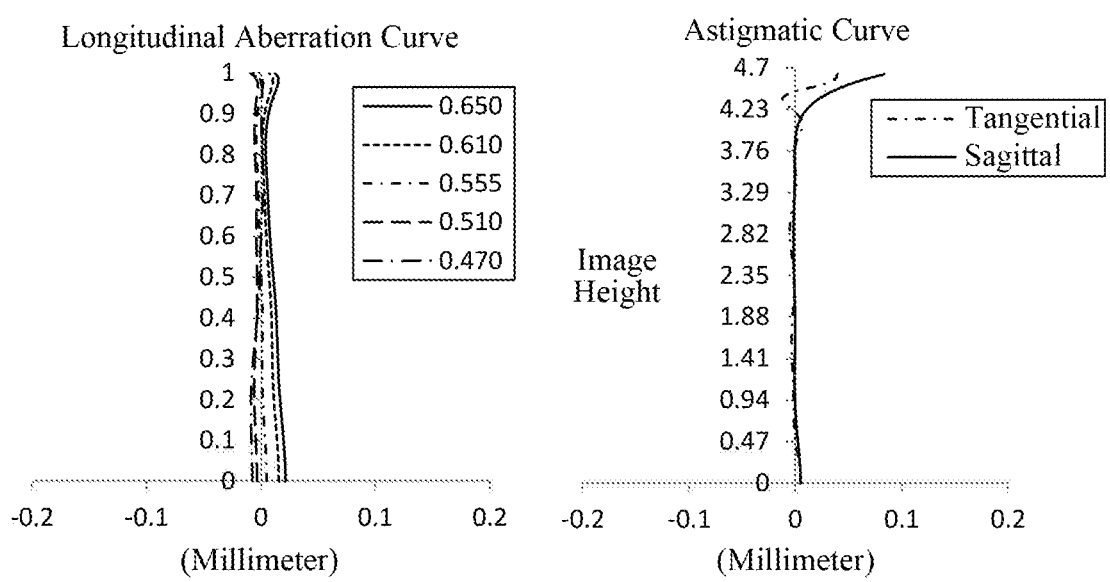
Fig. 6A
Fig. 6B

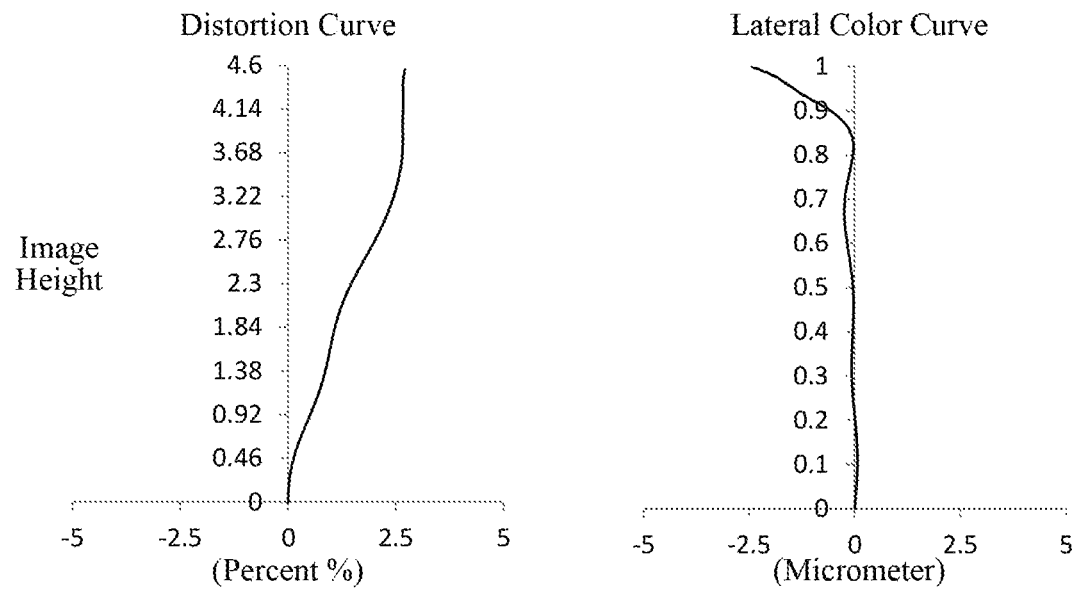
Fig. 10C
Fig. 10D
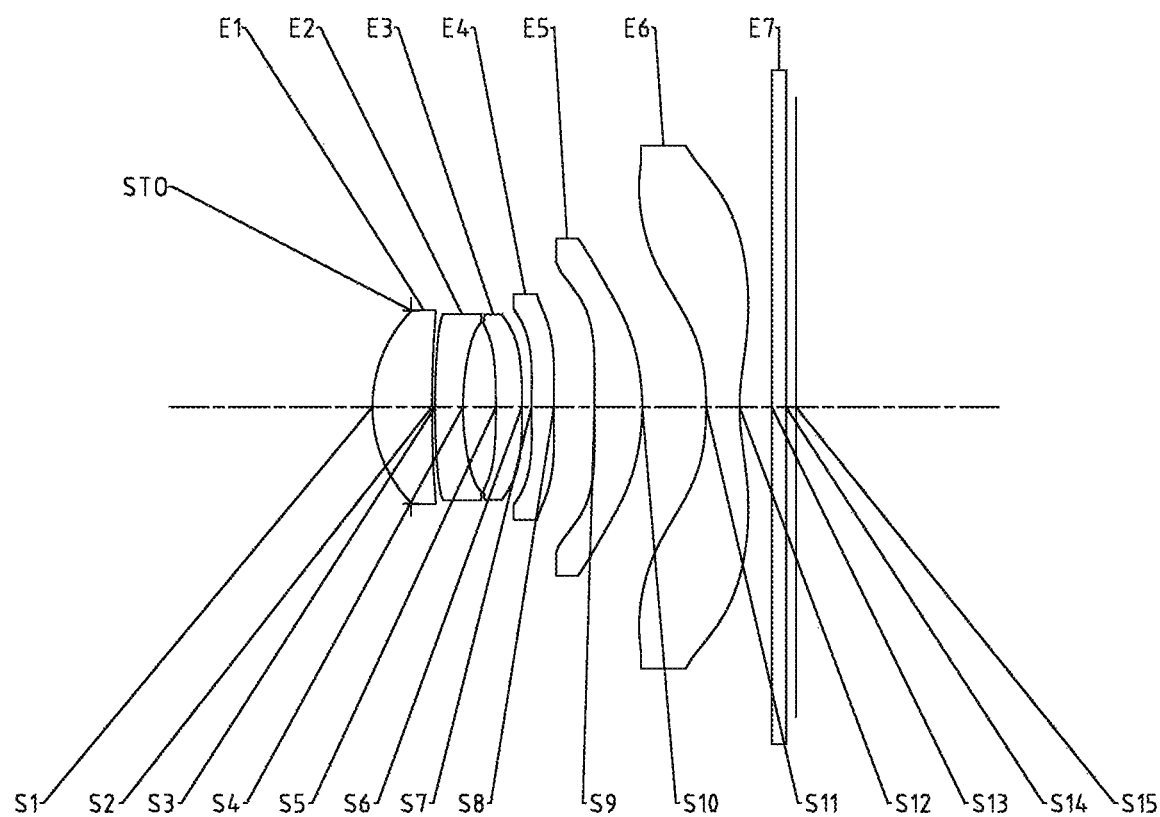
Fig. 11

OPTICAL IMAGING SYSTEM

CROSS-REFERENCE TO RELATED APPLICATION

This application claims benefit of priority to Chinese Patent Application No. 201910670576.1 filed on Jul. 24, 2019 before the China National Intellectual Property Administration, the entire disclosure of which is incorporated herein by reference in its entity.

TECHNICAL FIELD

The present disclosure relates to an optical imaging system, and more particularly, to an optical imaging system including six lenses.

BACKGROUND

In recent years, with the development of science and technology, the demand for an optical imaging system suitable for a portable electronic product is gradually increasing. The rapid development of mobile phone camera modules, especially the popularization of large-size, high-pixel CMOS chips, makes the mobile phone manufacturers put forward more stringent requirements for the imaging quality of optical imaging systems. In addition, as the thickness size of a portable electronic device, such as a mobile phone, is reduced, a higher demand is also placed on the miniaturization of the associated imaging system.

In order to meet the miniaturization requirement and meet the imaging requirement, there is a need for an optical imaging system capable of combining miniaturization with a large image plane and having a high resolution.

SUMMARY

The present disclosure provides an optical imaging system that is applicable to a portable electronic product and at least solves or partially solves at least one of the above-mentioned disadvantages of the prior art.

The present disclosure provides an optical imaging system which includes, sequentially from an object side to an image side along an optical axis, a first lens having positive refractive power; a second lens having negative refractive power; a third lens having refractive power, an object-side surface of the third lens may be a concave surface and an image-side surface of the third lens may be a convex surface; a fourth lens having refractive power; a fifth lens having positive refractive power, and an object-side surface of the fifth lens may be a convex surface; a sixth lens having negative refractive power, an object-side surface of the sixth lens may be a concave surface and an image-side surface of the sixth lens may be a concave surface.

In one embodiment, an effective focal length f of the optical imaging system and half of a maximum field-of-view angle Semi-FOV of the optical imaging system may satisfy $f*\tan(\text{Semi-FOV}) > 4.4$ mm.

In one embodiment, a distance TTL along the optical axis from an object-side surface of the first lens to an imaging plane of the optical imaging system, an effective focal length f of the optical system, half of a diagonal length ImgH of an effective pixel region on the imaging plane, and an entrance pupil diameter EPD of the optical imaging system may satisfy $TTL*f/(ImgH*EPD) < 2.7$.

In one embodiment, an on-axis distance SAG21 between an intersection point of an object-side surface of the second lens and the optical axis to a vertex of an effective radius of the object-side surface of the second lens and a spaced interval T12 between the first lens and the second lens along the optical axis may satisfy $-0.6 < SAG21/T12 < 3.6$.

In one embodiment, a spaced interval T56 between the fifth lens and the sixth lens along the optical axis and a distance TTL along the optical axis from an object-side surface of the first lens to an imaging plane of the optical imaging system may satisfy $1.5 < T56/TTL*10 < 1.7$.

In one embodiment, a spaced interval T56 between the fifth lens and the sixth lens along the optical axis and a center thickness CT6 of the sixth lens along the optical axis may satisfy $1.8 < T56/CT6 < 2.2$.

In one embodiment, an effective focal length f5 of the fifth lens and an effective focal length f of the optical imaging system may satisfy $1 < f5/f < 1.3$.

In one embodiment, an effective focal length f6 of the sixth lens and a radius of curvature R11 of the object-side surface of the sixth lens may satisfy $0.4 < f6/R11 < 0.8$.

In one embodiment, an effective focal length f5 of the fifth lens may satisfy $5.6$ mm $< f5 < 6.1$ mm.

In one embodiment, an effective focal length f of the optical imaging system, an effective focal length f1 of the first lens, and an effective focal length f2 of the second lens may satisfy $0.2 < f/(f1-f2) < 0.5$.

In one embodiment, a radius of curvature R12 of the image-side surface of the sixth lens and an effective focal length f of the optical imaging system may satisfy $0.3 < R12/f < 0.8$.

In one embodiment, a radius of curvature R9 of the object-side surface of the fifth lens and a radius of curvature R10 of an image-side surface of the fifth lens may satisfy $0.3 < (R9+R10)/(R9-R10) < 0.9$.

In one embodiment, an object-side surface of the first lens may be convex and an image-side surface of the first lens may be concave.

In one embodiment, an image-side surface of the second lens may be concave.

In one embodiment, an image-side surface of the fifth lens may be convex.

In the present disclosure, six lenses are employed. The optical imaging system has at least one beneficial effect of a large imaging plane, miniaturization, high resolution, and the like, by rationally collocating lenses of different materials and rationally distributing the refractive power of each lens, the shape, the center thickness of each lens, and the on-axis spacing between lenses.

BRIEF DESCRIPTION OF THE DRAWINGS

Other features, objects, and advantages of the present disclosure will become more apparent from the following detailed description of non-limiting embodiments, taken in conjunction with the accompanying drawings. In the drawings:

FIGS. 2A to 2D show a longitudinal aberration curve, an astigmatic curve, a distortion curve and a lateral color curve, respectively, of the optical imaging system of Example 1;

FIG. 3 shows a schematic structural diagram of an optical imaging system according to Example 2 of the present disclosure;

FIG. 5 shows a schematic structural diagram of an optical imaging system according to Example 3 of the present disclosure;

FIGS. 6A to 6D show a longitudinal aberration curve, an astigmatic curve, a distortion curve and a lateral color curve, respectively, of the optical imaging system of Example 3;

FIGS. 10A to 10D show a longitudinal aberration curve, an astigmatic curve, a distortion curve and a lateral color curve, respectively, of the optical imaging system of Example 5;

FIG. 11 shows a schematic structural diagram of an optical imaging system according to Example 6 of the present disclosure;

DETAILED DESCRIPTION OF EMBODIMENTS

Figure 1:
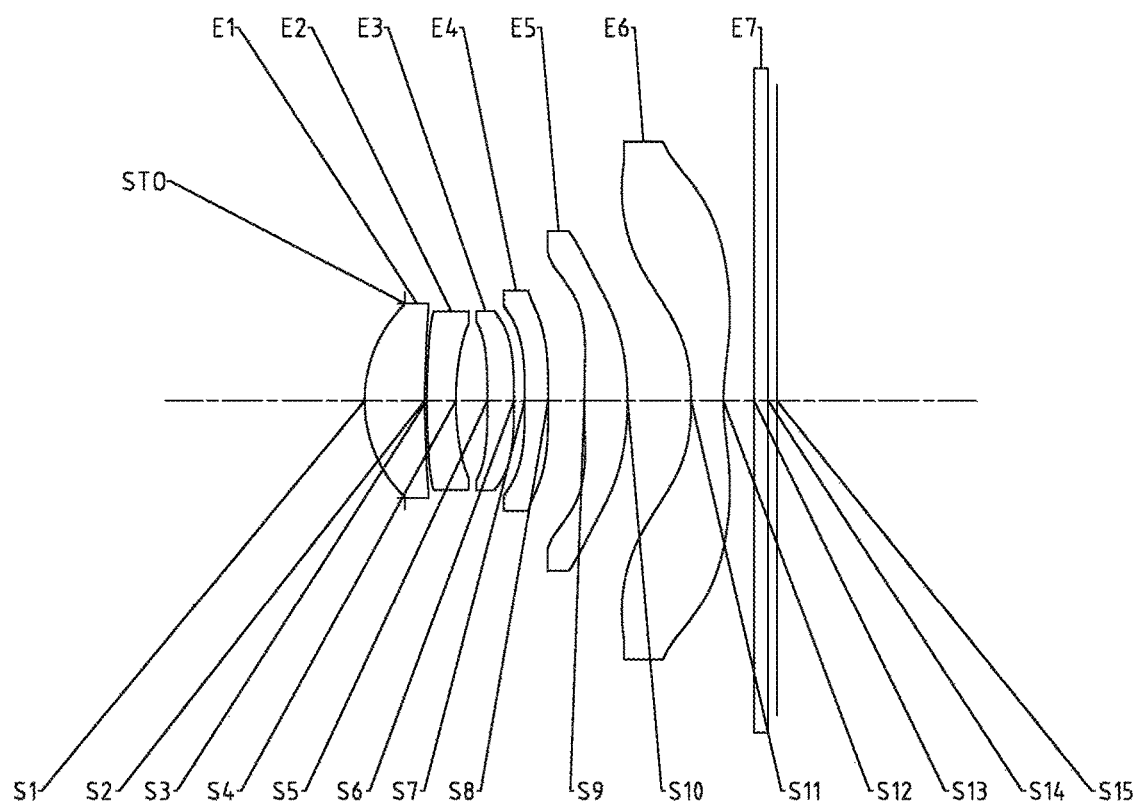
FIG. 1 shows a schematic structural diagram of an optical imaging system according to Example 1 of the present disclosure.

For a better understanding of the present disclosure, various aspects of the present disclosure will be described in more detail with reference to the accompanying drawings. It is to be understood that these detailed descriptions are merely illustrative of exemplary embodiments of the present disclosure and are not intended to limit the scope of the present disclosure in any way. Throughout the specification, like reference numerals refer to like elements. The expression "and/or" includes any and all combinations of one or more of the associated listed items.

It should be noted that, in this specification, the expressions such as first, second, third are used merely for distinguishing one feature from another, without indicating any limitation on the features. Thus, a first lens discussed below may also be referred to as a second lens or a third lens without departing from the teachings of the present disclosure.

In the drawings, the thickness, size and shape of the lens have been slightly exaggerated for ease of illustration. In particular, the shape of the spherical or aspherical surface shown in the drawings is shown by way of example. That is, the shape of the spherical or aspherical surface is not limited to the shape of the spherical or aspherical surface shown in the drawings. The drawings are merely illustrative and not strictly to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, six lenses having refractive power, that is, a first lens, a second lens, a third lens, a fourth lens, a fifth lens, and a sixth lens. The six lenses are arranged sequentially along the optical axis from the object side to the image side. In the first lens to the sixth lens, there may be air spaces between each two adjacent lenses.

In an exemplary embodiment, the first lens may have positive refractive power; the second lens may have negative refractive power; the third lens has positive refractive power or negative refractive power, an object-side surface of the third lens may be a concave surface and an image-side surface of the third lens may be a convex surface; the fourth lens has positive refractive power or negative refractive power; the fifth lens may have positive refractive power and an object-side surface of the fifth lens may be a convex surface; the sixth lens may have negative refractive power, an object-side surface of the sixth lens may be a concave surface, and an image-side surface of the sixth lens may be a concave surface. By reasonably controlling the positive and negative distribution of the refractive power of each component of the system and the curvature of the lens surface, the spherical aberration and the chromatic aberration of the optical imaging system can be effectively corrected, so that the refractive power of each lens is relatively balanced, and the sensitivity of the lens is reduced. In addition, each lens is made to have good processability, and the optical imaging system is made easy to assemble.

In an exemplary embodiment, an object-side surface of the first lens may be a convex surface and an image-side surface thereof may be a concave surface. An image-side surface of the second lens may be a concave surface. An image-side surface of the fifth lens may be a convex surface. By controlling the shape of the respective surface of the first lens, the second lens, and the fifth lens, the sensitivity of these surfaces may be reduced. Furthermore, the imaging light can be effectively converged and the deflection of the imaging light can be slowed down.

In an exemplary embodiment, the optical imaging system of the present disclosure may satisfy the conditional expression $f*\tan(\text{Semi-FOV})>4.4$ mm, where f is an effective focal length of the optical imaging system and Semi-FOV is half of a maximum field-of-view angle of the optical imaging system. More specifically, f and Semi-FOV may satisfy 4.42 mm $<f*\tan(\text{Semi-FOV})<4.7$ mm. Controlling the effective focal length and half of the maximum field-of-view angle of the optical imaging system allows the optical imaging system to capture sufficient object-side information.

In an exemplary embodiment, an optical imaging system of the present disclosure may satisfy the conditional expression $TTL*f/(\text{ImgH}*EPD)<2.7$, where TTL is a distance along the optical axis from an object-side surface of the first lens to an imaging plane of the optical imaging system, f is an effective focal length of the optical imaging system, ImgH is half of a diagonal length of an effective pixel region on the imaging plane, and EPD is an entrance pupil diameter of the optical imaging system. More specifically, TTL, f, ImgH, and EPD may satisfy $2.35<TTL*f/(\text{ImgH}*EPD)<2.65$. By controlling the total optical length, the effective focal length, the image height, and the entrance pupil diameter of the optical imaging system, the optical imaging system can have a miniaturized feature while having a large imaging plane. When the optical imaging system also satisfies the conditional expression $f*\tan(\text{Semi-FOV})>4.4$ mm, the image obtained using the optical imaging system can present more detail information of the object to be captured.

In an exemplary embodiment, the optical imaging system of the present disclosure may satisfy the conditional expression $-0.6<SAG21/T12<3.6$, where SAG21 is an on-axis distance between an intersection point of an object-side surface of the second lens and the optical axis to a vertex of an effective radius of the object-side surface of the second lens, and T12 is a spaced interval between the first lens and the second lens along the optical axis. More specifically, SAG21 and T12 may satisfy $-0.55<SAG21/T12<3.55$. By controlling the sag of the object-side surface of the second lens and the spaced interval between the first lens and the second lens along the optical axis, the deflection of the imaging light at the object-side surface of the second lens can be effectively slowed down, and the sensitivity of the second lens can be reduced. In addition, the spherical aberration and the astigmatism generated by the first lens can be corrected, so that the optical imaging system has good imaging performance.

In an exemplary embodiment, the optical imaging system of the present disclosure may satisfy the conditional expression $1.5<T56/TTL*10<1.7$, where T56 is a spaced interval between the fifth lens and the sixth lens along the optical axis, and TTL is a distance along the optical axis from an object-side surface of the first lens to an imaging plane of the optical imaging system. More specifically, T56 and TTL may satisfy $1.51<T56/TTL*10<1.69$. Controlling the ratio of the distance between the fifth lens and the sixth lens along the optical axis to the total optical length of the optical imaging system can reduce the deflection angle of the imaging light between the fifth lens and the sixth lens. Meanwhile, by controlling the spaced interval between the two lenses, the assembly difficulty of the optical imaging system may be reduced.

In an exemplary embodiment, the optical imaging system of the present disclosure may satisfy the conditional expression $1.8<T56/CT6<2.2$, where T56 is a spaced interval between the fifth lens and the sixth lens along the optical axis, and CT6 is a center thickness of the sixth lens along the optical axis. More specifically, T56 and CT6 may satisfy $1.87<T56/CT6<2.14$. By controlling the ratio of the spaced interval of the fifth lens and the sixth lens along the optical axis to the center thickness of the sixth lens, the chief ray angle at the imaging plane can be reduced, so that the optical imaging system can better match the imaging chip. In addition, the sixth lens can be made to have good process ability.

In an exemplary embodiment, the optical imaging system of the present disclosure may satisfy the conditional expression $1<f5/f<1.3$, where f5 is an effective focal length of the fifth lens and f is an effective focal length of the optical imaging system. More specifically, f5 and f may satisfy $1.03<f5/f<91.21$. By controlling the ratio of the effective focal length of the fifth lens to the effective focal length of the optical imaging system, the astigmatic and the field curvature generated by the lenses at the object side of the fifth lens can be effectively reduced, the deflection angle of the imaging light can be reduced, the intensity of the total reflection ghost image can be reduced or the total reflection ghost image can be eliminated, so that the optical imaging system has good imaging performance.

In an exemplary embodiment, the optical imaging system of the present disclosure may satisfy the conditional expression $0.4<f6/R11<0.8$, where f6 is an effective focal length of the sixth lens and R11 is a radius of curvature of an object-side surface of the sixth lens. More specifically, f6 and R11 may satisfy $0.63<f6/R11<0.77$. By controlling the ratio of the effective focal length of the sixth lens to the radius of curvature of the object-side surface of the sixth lens, the deflection angle of the imaging light at the object-side surface can be reduced, and the astigmatic, distortion and field curvature generated by the lenses at the object side of the sixth lens can be reduced, respectively, so that the optical imaging system has good imaging performance.

In an exemplary embodiment, the optical imaging system of the present disclosure may satisfy the conditional expression 5.6 mm $<f5<6.1$ mm, where f5 is an effective focal length of the fifth lens. More specifically, f5 may satisfy 5.7 mm $<f5<6.0$ mm. By controlling the effective focal length of the fifth lens, the refractive power of each lens can be balanced, and the incident angle and the outgoing angle of the imaging light at the fifth lens can be slowed down, thereby reducing the sensitivity of the fifth lens.

In an exemplary embodiment, the optical imaging system of the present disclosure may satisfy the conditional expression $0.2<f/(f1-f2)<0.5$, where f is an effective focal length of the optical imaging system, f1 is an effective focal length of the first lens, and f2 is an effective focal length of the second lens. More specifically, f, f1, and f2 may satisfy 0.30<f/(f1-f2)<0.45. By controlling the effective focal length of the first lens, the effective focal length of the second lens, and the effective focal length of the optical imaging system, the imaging light can be effectively converged, and the spherical aberration, the astigmatic, the field curvature, and the color aberration generated by the two lenses are respectively compensated, thereby improving the imaging quality of the optical imaging system.

In an exemplary embodiment, the optical imaging system of the present disclosure may satisfy the conditional expression 0.3<R12/f<0.8, where R12 is a radius of curvature of an image-side surface of the sixth lens and f is an effective focal length of the optical imaging system. More specifically, R12 and f may satisfy 0.55<R12/f<0.65. By controlling the ratio of the radius of curvature of the image-side surface of the sixth lens to the effective focal length of the optical imaging system, the angle between the imaging light and the imaging plane can be reduced, so that the illumination of the imaging plane can be increased, and the optical imaging system and the imaging chip can be well matched.

In an exemplary embodiment, the optical imaging system of the present disclosure may satisfy the conditional expression 0.3<(R9+R10)/(R9-R10)<0.9, where R9 is a radius of curvature of an object-side surface of the fifth lens and R10 is a radius of curvature of an image-side surface of the fifth lens. More specifically, R9 and R10 may satisfy 0.31<(R9+R10)/(R9-R10)<0.89. By controlling the radius of curvature of each of the two surfaces of the fifth lens, the incident angle and the outgoing angle of the imaging light at the fifth lens can be reduced, thereby reducing the sensitivity of the two surfaces. In addition, the high-level coma generated by the two surfaces can be compensated.

In an exemplary embodiment, the above-described optical imaging system may further include at least one stop. The stop may be provided in an appropriate position as desired, for example, between the object side and the first lens. Alternatively, the above-described optical imaging system may further include a filter for correcting color deviations and/or a protective glass for protecting the photosensitive element located on the imaging plane.

The optical imaging system according to the above embodiments of the present disclosure may employ multiple lenses, such as six lenses as described above. By reasonably distributing the refractive power of each lens, the shape, the center thickness of each lens, the on-axis spaced intervals between each lens, and the like, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure has excellent optical properties such as large imaging plane, miniaturization, high resolution, and the like.

In an embodiment of the present disclosure, at least one of the surfaces of each lens is aspheric, that is, at least one of the object-side surface of the first lens to the image-side surface of the sixth lens is aspheric. The aspheric lens is characterized in that the curvature varies continuously from the center of the lens to the periphery of the lens. Unlike spherical lenses having a constant curvature from the center of the lens to the periphery of the lens, aspheric lenses have better radius of curvature characteristics, and have the advantages of reducing aberration and astigmatism. With the aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, and the sixth lens is aspheric. Optionally, the object-side surface and the image-side surface of each of the first lens, the second lens, the third lens, the fourth lens, the fifth lens, and the sixth lens are aspheric.

However, it will be appreciated by those skilled in the art that the number of lenses constituting the optical imaging lens assembly may be varied without departing from the claimed technical solution of the present disclosure to obtain the various results and advantages described in this specification. For example, although six lenses have been described in the embodiment, the optical imaging lens assembly is not limited to include six lenses. If desired, the optical imaging lens assembly may also include other numbers of lenses.

Some specific examples of an optical imaging lens assembly applicable to the above-described embodiment will be further described below with reference to the accompanying drawings.

EXAMPLE 1

An optical imaging system according to Example 1 of the present disclosure is described below with reference to FIGS. 1 to 2D. FIG. 1 shows a schematic structural diagram of an optical imaging system according to Example 1 of the present disclosure.

As shown in FIG. 1, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has positive refractive power, an object-side surface S5 thereof is a concave surface and an image-side surface S6 thereof is a convex surface. The fourth lens E4 has negative refractive power, an object-side surface S7 thereof is a concave surface and an image-side surface S8 thereof is a concave surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

Table 1 shows a table of basic parameters of the optical imaging system of Example 1, wherein the radius of curvature, the thickness/distance and the focal length are all in millimeters (mm).

TABLE 1

| Surface Number | Surface type | Radius of curvature | Thickness/ Distance | Material Refractive index | Abbe Number | Focal length | Conic coefficient |
|---|---|---|---|---|---|---|---|
| OBJ | Spherical | Infinite | Infinite | | | | |
| STO | Spherical | Infinite | −0.6080 | | | | |
| S1 | Aspheric | 2.0455 | 0.9091 | 1.55 | 56.1 | 4.45 | −2.4565 |
| S2 | Aspheric | 10.8160 | 0.0300 | | | | −7.6070 |
| S3 | Aspheric | 8.6243 | 0.4350 | 1.68 | 19.2 | −12.11 | −20.1005 |
| S4 | Aspheric | 4.1257 | 0.4772 | | | | −5.9963 |
| S5 | Aspheric | −16.3294 | 0.4019 | 1.55 | 56.1 | 2272.97 | −90.2531 |
| S6 | Aspheric | −16.2577 | 0.1618 | | | | −42.8198 |
| S7 | Aspheric | −85.7588 | 0.3500 | 1.67 | 20.4 | −70.23 | −99.0000 |
| S8 | Aspheric | 103.8418 | 0.5549 | | | | −99.0000 |
| S9 | Aspheric | 12.4791 | 0.6539 | 1.55 | 56.1 | 5.90 | −96.8031 |
| S10 | Aspheric | −4.2645 | 0.9559 | | | | −4.4313 |
| S11 | Aspheric | −4.6621 | 0.4872 | 1.54 | 55.9 | −3.42 | 0.0354 |
| S12 | Aspheric | 3.1447 | 0.4626 | | | | −18.4131 |
| S13 | Spherical | Infinite | 0.2100 | 1.52 | 64.2 | | |
| S14 | Spherical | Infinite | 0.1302 | | | | |
| S15 | Spherical | Infinite | | | | | |

In Example 1, an effective focal length f of the optical imaging system is 5.41 mm, a distance TTL along the optical axis from the object-side surface S1 of the first lens E1 to the imaging plane S15 is 6.22 mm, and half of a diagonal length ImgH of an effective pixel region on the imaging plane S15 is 4.74 mm.

In Example 1, the object-side surface and the image-side surface of any one of the first lenses E1 to the sixth lens E6 are aspheric surfaces, and the surface type x of each aspheric lens may be defined by, but is not limited to, the following aspheric surface formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S12 in example 1.

TABLE 2

| Surface No. | A4 | A6 | A8 | A10 | A12 |
|---|---|---|---|---|---|
| S1 | 3.7097E−02 | −8.5000E−04 | 1.0400E−04 | 1.3810E−03 | −1.7100E−03 |
| S2 | −5.2160E−02 | 8.2185E−02 | −9.3420E−02 | 8.2094E−02 | −5.1930E−02 |
| S3 | −4.7210E−02 | 7.5134E−02 | −7.7010E−02 | 6.1754E−02 | −3.1670E−02 |
| S4 | 6.2710E−03 | 2.1105E−02 | −2.4440E−02 | 1.1588E−02 | 5.8936E−02 |
| S5 | −4.0250E−02 | −5.5080E−01 | 2.1681E−01 | −6.2691E−01 | 1.1069E+00 |
| S6 | −8.7230E−02 | 3.6803E−02 | −2.9590E−02 | 1.1216E−02 | 6.8900E−04 |
| S7 | −1.3175E−01 | 6.9020E−02 | −3.4760E−02 | 3.3828E−02 | −4.4770E−02 |
| S8 | −1.0388E−01 | 4.4395E−02 | −1.8110E−02 | 1.8827E−02 | −2.1680E−02 |
| S9 | −2.0940E−02 | −2.4650E−02 | 2.0819E−02 | −1.4400E−02 | 7.9720E−03 |
| S10 | 2.2440E−03 | −2.0600E−02 | 9.5010E−03 | −2.8300E−03 | 8.2200E−04 |
| S11 | −8.6970E−02 | 2.8155E−02 | −3.4100E−03 | 1.5700E−04 | −1.6000E−07 |
| S12 | −4.3290E−02 | 1.1532E−02 | −2.1100E−03 | 3.0800E−04 | −3.9000E−05 |

| Surface No. | A14 | A16 | A18 | A20 |
|---|---|---|---|---|
| S1 | 1.4140E−03 | −7.8000E−04 | 2.4900E−04 | −3.7000E−05 |
| S2 | 2.1961E−02 | −5.8400E−03 | 9.2600E−04 | −8.1000E−05 |
| S3 | 7.9940E−03 | 5.6900E−04 | −7.6000E−04 | 1.1200E−04 |
| S4 | −1.3941E−01 | 1.4173E−01 | −7.0860E−02 | 1.4403E−02 |
| S5 | −1.2281E+00 | 8.3137E−01 | −3.1377E−01 | 5.0819E−02 |
| S6 | −1.5750E−02 | 1.8130E−02 | −8.1700E−03 | 1.3650E−03 |
| S7 | 2.9281E−02 | −9.3500E−03 | 1.5530E−03 | −1.4000E−04 |
| S8 | 1.3633E−02 | −4.7500E−03 | 9.1600E−04 | −7.7000E−05 |
| S9 | −3.0600E−03 | 7.1000E−04 | −8.7000E−05 | 4.3100E−06 |
| S10 | −1.8000E−04 | 2.2600E−05 | −1.4000E−06 | 3.2600E−08 |
| S11 | 6.3800E−07 | −1.4000E−07 | 8.5800E−09 | −1.8000E−10 |
| S12 | 3.8700E−06 | −2.5000E−07 | 9.3700E−09 | −1.5000E−10 |

Figures 2A, 2B:
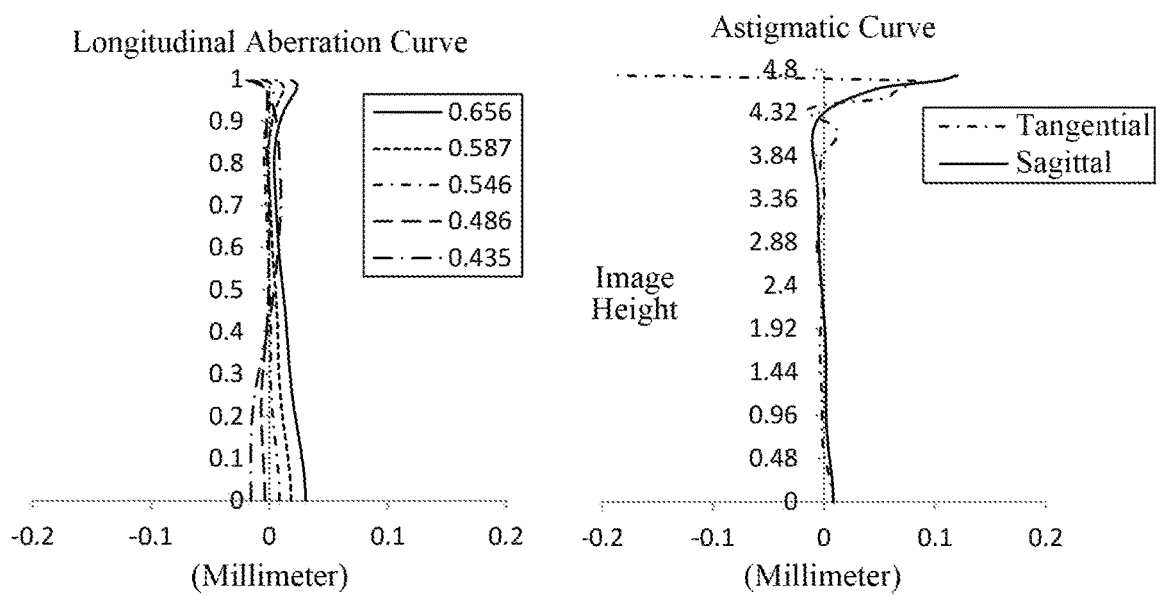

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion corresponding to different image heights. FIG. 2D illustrates a lateral color curve of the optical imaging system according to example 1, representing deviations of different image heights on an imaging plane after light passes through the optical imaging system. As can be seen from FIGS. 2A to 2D, the optical imaging lens assembly according to Example 1 can achieve good imaging quality.

EXAMPLE 2

An optical imaging system according to Example 2 of the present disclosure is described below with reference to FIGS. 3 to 4D. In the present embodiment and the following examples, a description similar to Example 1 will be omitted for brevity. FIG. 3 shows a schematic structural diagram of an optical imaging system according to Example 2 of the present disclosure.

As shown in FIG. 3, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a concave surface and an image-side surface S4 thereof is a concave surface. The third lens E3 has positive refractive power, an object-side surface S5 thereof is a concave surface and an image-side surface S6 thereof is a convex surface. The fourth lens E4 has negative refractive power, an object-side surface S7 thereof is a convex surface and an image-side surface S8 thereof is a concave surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

In Example 2, an effective focal length f of the optical imaging system is 5.41 mm, a distance TTL along the optical axis from the object-side surface S1 of the first lens E1 to the imaging plane S15 is 6.23 mm, and half of a diagonal length ImgH of an effective pixel region on the imaging plane S15 is 4.70 mm.

Table 3 shows a table of basic parameters of the optical imaging system of Example 2, wherein the radius of curvature, the thickness and the focal length are all in millimeters (mm). Table 4 shows the high-order coefficients that can be applicable to each aspheric surface in Example 2, wherein each aspheric type may be defined by Equation (1) given in Example 1 above.

TABLE 3

| Surface Number | Surface type | Radius of curvature | Thickness/ Distance | Material Refractive index | Abbe Number | Focal length | Conic coefficient |
|---|---|---|---|---|---|---|---|
| OBJ | Spherical | Infinite | Infinite | | | | |
| STO | Spherical | Infinite | −0.5077 | | | | |
| S1 | Aspheric | 2.1297 | 0.8542 | 1.55 | 56.1 | 3.99 | −2.6301 |
| S2 | Aspheric | 81.1764 | 0.0500 | | | | 50.0000 |
| S3 | Aspheric | −20.6768 | 0.4461 | 1.63 | 23.3 | −8.66 | −99.0000 |
| S4 | Aspheric | 7.6269 | 0.4547 | | | | −26.3114 |
| S5 | Aspheric | −46.6814 | 0.4285 | 1.55 | 56.1 | 79.50 | 50.0000 |
| S6 | Aspheric | −22.5761 | 0.2052 | | | | 50.0000 |
| S7 | Aspheric | 27.2051 | 0.3300 | 1.68 | 19.0 | −40.13 | 50.0000 |
| S8 | Aspheric | 13.6344 | 0.5142 | | | | −9.5235 |
| S9 | Aspheric | 9.4766 | 0.5348 | 1.55 | 56.1 | 5.95 | −67.4240 |
| S10 | Aspheric | −4.8484 | 1.0536 | | | | −7.6704 |
| S11 | Aspheric | −4.4998 | 0.5577 | 1.54 | 55.9 | −3.27 | 0.0475 |
| S12 | Aspheric | 3.0131 | 0.4617 | | | | −20.1140 |
| S13 | Spherical | Infinite | 0.2100 | 1.52 | 64.2 | | |
| S14 | Spherical | Infinite | 0.1297 | | | | |
| S15 | Spherical | Infinite | | | | | |

TABLE 4

| Surface No. | A4 | A6 | A8 | A10 | A12 |
|---|---|---|---|---|---|
| S1 | 3.5453E−02 | −1.3000E−04 | −6.4900E−03 | 2.0796E−02 | −3.1590E−02 |
| S2 | −2.7190E−02 | 3.2948E−02 | 9.0790E−03 | −9.6360E−02 | 1.7533E−01 |
| S3 | −3.2300E−02 | 5.0263E−02 | −2.8930E−02 | −1.4130E−02 | 5.4051E−02 |
| S4 | −5.2700E−03 | 2.4306E−02 | −1.1220E−02 | −3.9280E−02 | 1.3303E−01 |
| S5 | −6.7730E−02 | −2.3440E−02 | 9.8604E−02 | −3.0153E−01 | 5.2428E−01 |

TABLE 4-continued

| S6 | −1.0884E−01 | 7.6607E−02 | −1.1317E−01 | 1.2859E−01 | −1.2505E−01 |
| S7 | −1.5001E−01 | 1.4095E−01 | −1.4136E−01 | 1.4907E−01 | −1.5155E−01 |
| S8 | −1.3385E−01 | 1.0997E−01 | −9.3620E−02 | 8.3689E−02 | −6.6970E−02 |
| S9 | −3.8270E−02 | −1.0660E−02 | 1.9023E−02 | −1.7190E−02 | 9.6110E−03 |
| S10 | −1.1500E−02 | −1.1490E−02 | 1.1349E−02 | −6.9300E−03 | 2.8010E−03 |
| S11 | −1.1694E−01 | 6.9688E−02 | −2.7890E−02 | 7.6980E−03 | −1.3700E−03 |
| S12 | −5.5260E−02 | 2.4946E−02 | −7.7700E−03 | 1.6390E−03 | −2.4000E−04 |

| Surface No. | A14 | A16 | A18 | A20 |
|---|---|---|---|---|
| S1 | 2.8333E−02 | −1.5080E−02 | 4.4080E−03 | −5.5000E−04 |
| S2 | −1.7182E−01 | 9.5489E−02 | −2.7840E−02 | 3.2570E−03 |
| S3 | −5.9170E−02 | 3.3332E−02 | −9.1500E−03 | 9.0700E−04 |
| S4 | −1.9547E−01 | 1.5980E−01 | −6.9530E−02 | 1.2730E−02 |
| S5 | −5.6696E−01 | 3.7423E−01 | −1.3788E−01 | 2.1881E−02 |
| S6 | 8.5590E−02 | −3.6190E−02 | 8.4270E−03 | −8.3000E−04 |
| S7 | 1.0763E−01 | 4.7230E−02 | 1.1626E−02 | −1.2300E−03 |
| S8 | 3.7231E−02 | −1.2860E−02 | 2.5010E−03 | −2.1000E−04 |
| S9 | −3.4200E−03 | 7.2300E−04 | −8.0000E−05 | 3.5300E−06 |
| S10 | −6.7000E−04 | 8.9600E−05 | −6.3000E−06 | 1.7600E−07 |
| S11 | 1.5500E−04 | −1.1000E−05 | 4.2500E−07 | −7.2000E−09 |
| S12 | 2.2900E−05 | −1.4000E−06 | 5.0900E−08 | −8.0000E−10 |

Figure 4A:
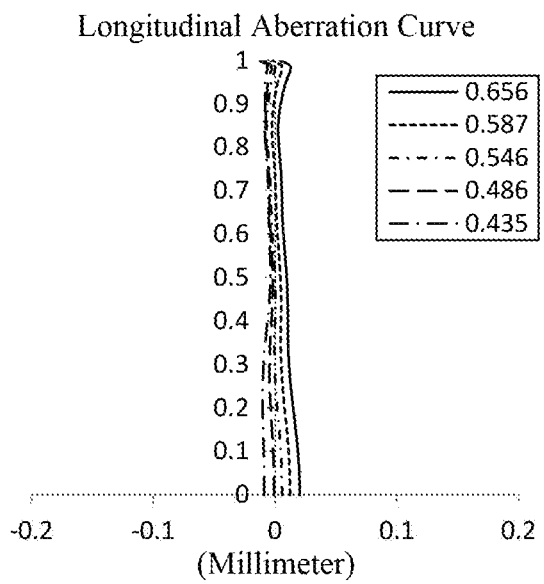
FIGS. 4A to 4D show a longitudinal aberration curve, an astigmatic curve, a distortion curve and a lateral color curve, respectively, of the optical imaging system of Example 2.
Figure 4B:
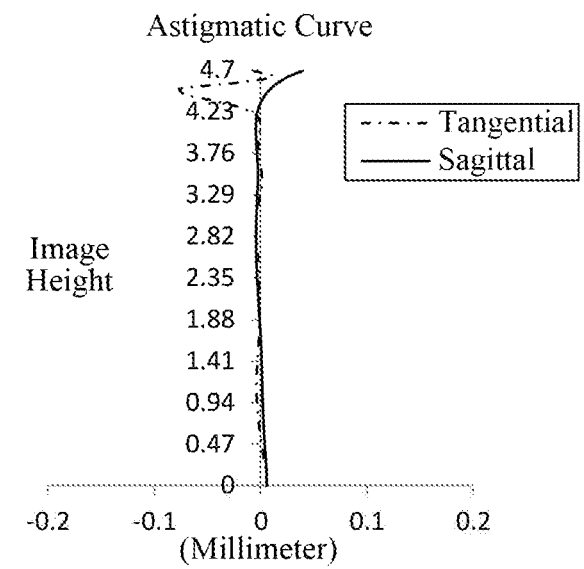
Figure 4C:
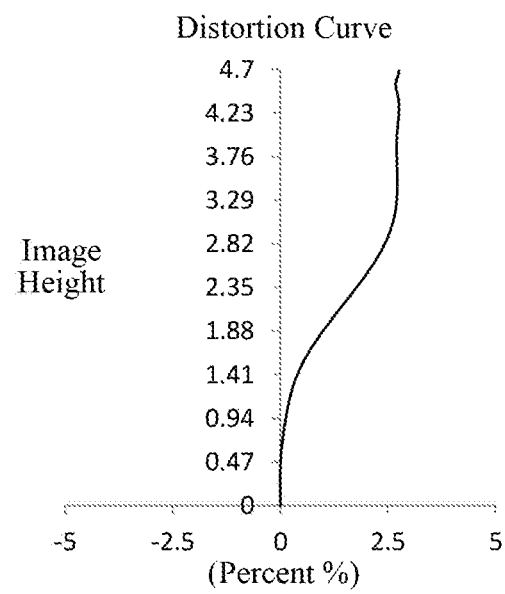
Figure 4D:
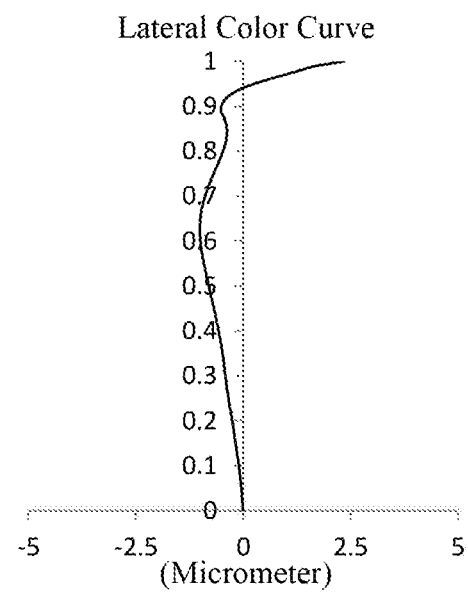

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion corresponding to different image heights. FIG. 4D illustrates a lateral color curve of the optical imaging system according to example 2, representing deviations of different image heights on an imaging plane after light passes through the optical imaging system. As can be seen from FIGS. 4A to 4D, the optical imaging lens assembly according to Example 2 can achieve good imaging quality.

EXAMPLE 3

An optical imaging system according to Example 3 of the present disclosure is described below with reference to FIGS. 5 to 6D. FIG. 5 shows a schematic structural diagram of an optical imaging system according to Example 3 of the present disclosure.

As shown in FIG. 5, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has positive refractive power, an object-side surface S5 thereof is a concave surface and an image-side surface S6 thereof is a convex surface. The fourth lens E4 has negative refractive power, an object-side surface S7 thereof is a convex surface and an image-side surface S8 thereof is a concave surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

In Example 3, an effective focal length f of the optical imaging system is 5.41 mm, a distance TTL along the optical axis from the object-side surface S1 of the first lens E1 to the imaging plane S15 is 6.22 mm, and half of a diagonal length ImgH of an effective pixel region on the imaging plane S15 is 4.63 mm.

Table 5 shows a table of basic parameters of the optical imaging system of Example 3, wherein the radius of curvature, the thickness and the focal length are all in millimeters (mm). Table 6 shows the high-order coefficients that can be applicable to each aspheric surface in Example 3, wherein each aspheric type may be defined by Equation (1) given in Example 1 above.

TABLE 5

| Surface Number | Surface type | Radius of curvature | Thickness/ Distance | Material Refractive index | Material Abbe Number | Focal length | Conic coefficient |
|---|---|---|---|---|---|---|---|
| OBJ | Spherical | Infinite | Infinite | | | | |
| STO | Spherical | Infinite | −0.5872 | | | | |
| S1 | Aspheric | 2.0397 | 0.8608 | 1.55 | 56.1 | 4.41 | −2.4733 |
| S2 | Aspheric | 11.3920 | 0.1112 | | | | 0.4204 |
| S3 | Aspheric | 10.4558 | 0.4054 | 1.68 | 19.2 | −10.31 | −10.7626 |

TABLE 5-continued

| Surface Number | Surface type | Radius of curvature | Thickness/ Distance | Material Refractive index | Abbe Number | Focal length | Conic coefficient |
|---|---|---|---|---|---|---|---|
| S4 | Aspheric | 4.1216 | 0.4195 | | | | −6.6320 |
| S5 | Aspheric | −64.9102 | 0.3914 | 1.55 | 56.1 | 552.69 | 27.7269 |
| S6 | Aspheric | −53.5324 | 0.1966 | | | | −95.5786 |
| S7 | Aspheric | 179.9392 | 0.3506 | 1.67 | 20.4 | −161.98 | 50.0000 |
| S8 | Aspheric | 67.4189 | 0.5624 | | | | −99.0000 |
| S9 | Aspheric | 13.9289 | 0.6141 | 1.55 | 56.1 | 5.99 | −98.8620 |
| S10 | Aspheric | −4.2025 | 1.0153 | | | | −4.1975 |
| S11 | Aspheric | −4.9556 | 0.4798 | 1.54 | 55.9 | −3.58 | 0.0150 |
| S12 | Aspheric | 3.2525 | 0.4676 | | | | −15.5254 |
| S13 | Spherical | Infinite | 0.2100 | 1.52 | 64.2 | | |
| S14 | Spherical | Infinite | 0.1352 | | | | |
| S15 | Spherical | Infinite | | | | | |

TABLE 6

| Surface No. | A4 | A6 | A8 | A10 | A12 |
|---|---|---|---|---|---|
| S1 | 3.7171E−02 | −6.5000E−04 | −1.5600E−03 | 4.3970E−03 | −5.1300E−03 |
| S2 | −2.4790E−02 | 2.0538E−02 | −6.4000E−03 | −1.0440E−02 | 2.1049E−02 |
| S3 | −3.4300E−02 | 3.5806E−02 | −1.2550E−02 | −7.7400E−03 | 2.2409E−02 |
| S4 | −3.2400E−03 | 2.9771E−02 | −1.9860E−02 | 9.8120E−03 | 3.1678E−02 |
| S5 | −4.9060E−02 | −5.0730E−02 | 2.4192E−01 | −7.2372E−01 | 1.2969E+00 |
| S6 | −8.3880E−02 | 2.6311E−02 | −2.1410E−02 | 2.2662E−02 | −3.9310E−02 |
| S7 | −1.1989E−01 | 4.8388E−02 | −2.4580E−02 | 3.8011E−02 | −5.7060E−02 |
| S8 | −9.8390E−02 | 2.9387E−02 | −2.1000E−03 | 1.8520E−03 | −6.3000E−03 |
| S9 | −2.0090E−02 | −2.5410E−02 | 1.9538E−02 | −1.4540E−02 | 8.9340E−03 |
| S10 | 4.7210E−03 | −2.0330E−02 | 7.9750E−03 | −2.4800E−03 | 9.6000E−04 |
| S11 | −7.3150E−02 | 1.9571E−02 | −6.5000E−04 | 4.5000E−04 | 9.1300E−05 |
| S12 | −3.9530E−02 | 9.3580E−03 | −1.3900E−03 | 1.4100E−04 | −1.3000E−05 |

| Surface No. | A14 | A16 | A18 | A20 |
|---|---|---|---|---|
| S1 | 3.8160E−03 | −1.8100E−03 | 4.9300E−04 | −6.1000E−05 |
| S2 | −1.8940E−02 | 9.4770E−03 | −2.5100E−03 | 2.6900E−04 |
| S3 | −2.2850E−02 | 1.3028E−02 | −3.9500E−03 | 4.9000E−04 |
| S4 | −8.0740E−02 | 8.6270E−02 | −4.4950E−02 | 9.5290E−03 |
| S5 | −1.4451E+00 | 9.7720E−01 | −3.6722E−01 | 5.9066E−02 |
| S6 | 4.0326E−02 | −2.3450E−02 | 7.5510E−03 | −1.0300E−03 |
| S7 | 4.5412E−02 | −2.1420E−02 | 6.0190E−03 | −7.7000E−04 |
| S8 | 4.6320E−03 | −1.7200E−03 | 3.7700E−04 | −3.8000E−05 |
| S9 | −3.6100E−03 | 8.5500E−04 | −1.1000E−04 | 5.3200E−06 |
| S10 | −2.6000E−04 | 3.6600E−05 | −2.6000E−06 | 6.6700E−08 |
| S11 | −8.6000E−06 | 4.4500E−07 | −1.2000E−08 | 1.4300E−10 |
| S12 | 1.1500E−06 | −7.9000E−08 | 3.2000E−09 | −5.4000E−11 |

Figures 6C, 6D:
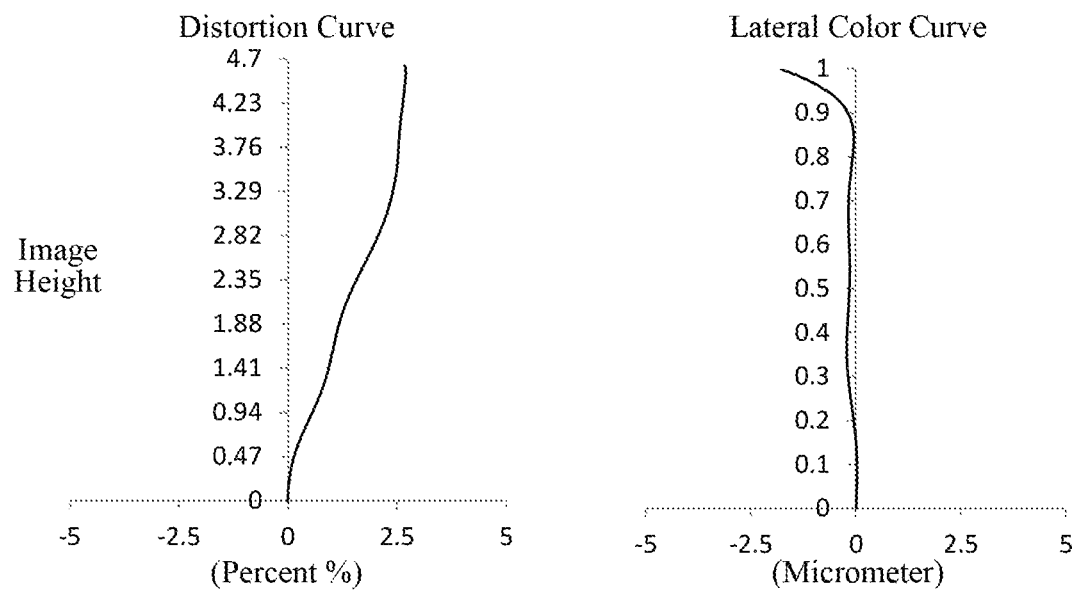

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion corresponding to different image heights. FIG. 6D illustrates a lateral color curve of the optical imaging system according to example 3, representing deviations of different image heights on an imaging plane after light passes through the optical imaging system. As can be seen from FIGS. 6A to 6D, the optical imaging lens assembly according to Example 3 can achieve good imaging quality.

EXAMPLE 4

Figure 7:
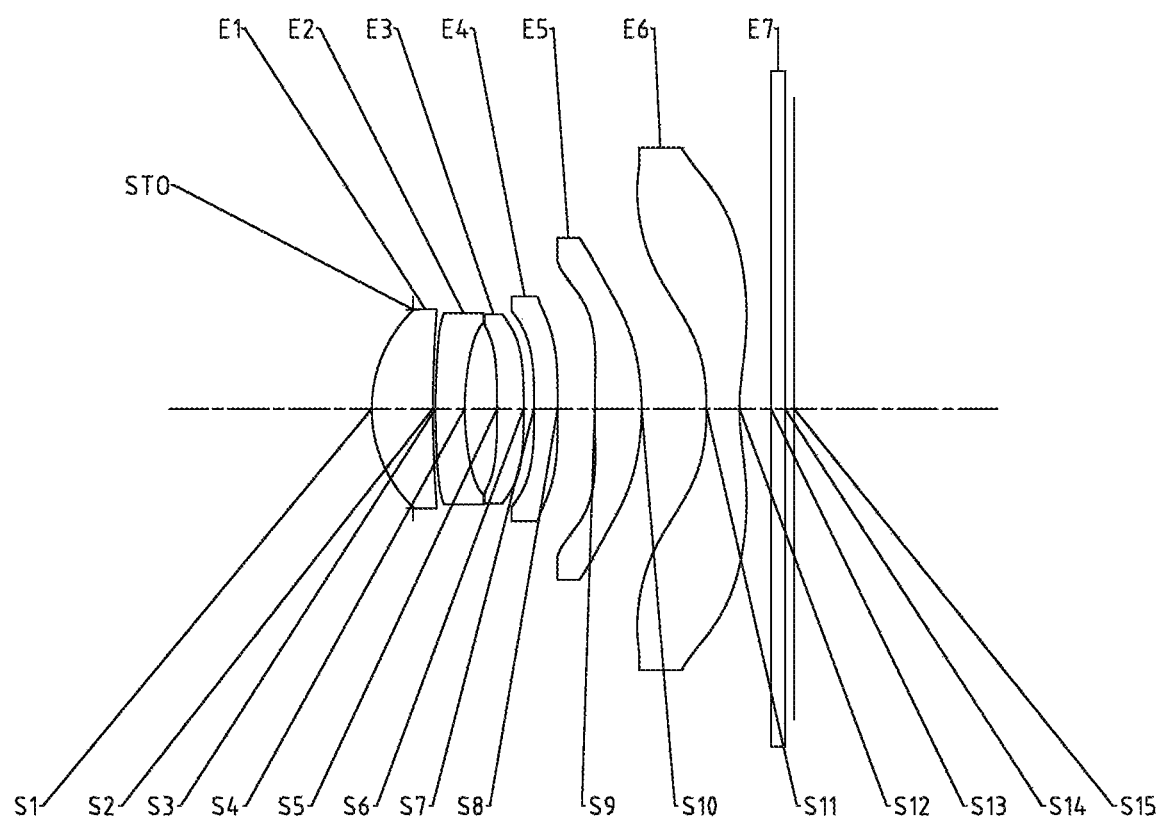
FIG. 7 is a schematic structural diagram of an optical imaging system according to Example 4 of the present disclosure.

An optical imaging system according to Example 4 of the present disclosure is described below with reference to FIGS. 7 to 8D. FIG. 7 shows a schematic structural diagram of an optical imaging system according to Example 4 of the present disclosure.

As shown in FIG. 7, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has negative refractive power, an object-side surface S5 thereof is a concave surface and an image-side surface S6 thereof is a convex surface. The fourth lens E4 has negative refractive power, an object-side surface S7 thereof is a convex surface and an image-side surface S8 thereof is a concave surface. The fifth lens E5 has a positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S11 to S14 and is finally imaged on the imaging plane S15.

In Example 4, an effective focal length f of the optical imaging system is 5.39 mm, a distance TTL along the optical axis from the object-side surface S1 of the first lens E1 to the imaging plane S15 is 6.25 mm, and half of a diagonal length ImgH of an effective pixel region on the imaging plane S15 is 4.58 mm.

Table 7 shows a table of basic parameters of the optical imaging system of Example 4, wherein the radius of curvature, the thickness and the focal length are all in millimeters (mm). Table 8 shows the high-order coefficients that can be applicable to each aspheric surface in Example 4, wherein each aspheric type may be defined by Equation (1) given in Example 1 above.

TABLE 7

| Surface Number | Surface type | Radius of curvature | Thickness/ Distance | Refractive index | Abbe Number | Focal length | Conic coefficient |
|---|---|---|---|---|---|---|---|
| OBJ | Spherical | Infinite | Infinite | | | | |
| STO | Spherical | Infinite | −0.6117 | | | | |
| S1 | Aspheric | 2.0488 | 0.9026 | 1.55 | 56.1 | 4.45 | −2.4675 |
| S2 | Aspheric | 11.0822 | 0.0400 | | | | −5.8425 |
| S3 | Aspheric | 8.8450 | 0.4334 | 1.68 | 19.2 | −11.92 | −18.8001 |
| S4 | Aspheric | 4.1385 | 0.4788 | | | | −6.1956 |
| S5 | Aspheric | −18.7761 | 0.3931 | 1.55 | 56.1 | −166.15 | −89.8558 |
| S6 | Aspheric | −23.8521 | 0.1518 | | | | −27.6991 |
| S7 | Aspheric | 2663.5280 | 0.3500 | 1.67 | 20.4 | −111.42 | −99.0000 |
| S8 | Aspheric | 72.2376 | 0.5502 | | | | −76.6922 |
| S9 | Aspheric | 15.5731 | 0.6920 | 1.55 | 56.1 | 5.77 | −88.4504 |
| S10 | Aspheric | −3.8828 | 0.9600 | | | | −4.2639 |
| S11 | Aspheric | −4.7813 | 0.4879 | 1.54 | 55.9 | −3.49 | 0.0727 |
| S12 | Aspheric | 3.1843 | 0.4663 | | | | −15.8915 |
| S13 | Spherical | Infinite | 0.2100 | 1.52 | 64.2 | | |
| S14 | Spherical | Infinite | 0.1338 | | | | |
| S15 | Spherical | Infinite | | | | | |

TABLE 8

| Surface No. | A4 | A6 | A8 | A10 | A12 |
|---|---|---|---|---|---|
| S1 | 3.6597E−02 | 1.3720E−03 | −6.2500E−03 | 1.1799E−02 | −1.2320E−02 |
| S2 | −4.5020E−02 | 6.0343E−02 | −5.6220E−02 | 4.3536E−02 | −2.8350E−02 |
| S3 | −4.3090E−02 | 6.0090E−02 | −5.1200E−02 | 3.9690E−02 | −2.6300E−02 |
| S4 | 5.4990E−03 | 1.6481E−02 | 1.5200E−05 | −4.2720E−02 | 1.2868E−01 |
| S5 | −4.2940E−02 | −3.9260E−02 | 1.5235E−01 | −4.5562E−01 | 8.1735E−01 |
| S6 | −9.0180E−02 | 4.0131E−02 | −3.4170E−02 | 1.6911E−02 | −3.2400E−03 |
| S7 | −1.3196E−01 | 7.0207E−02 | −4.0150E−02 | 3.9166E−02 | −4.3750E−02 |
| S8 | −1.0026E−01 | 4.0889E−02 | −1.4010E−02 | 1.2510E−02 | −1.4610E−02 |
| S9 | −2.5210E−02 | −1.9540E−02 | 1.7420E−02 | −1.3120E−02 | 7.8710E−03 |
| S10 | −1.5000E−03 | −1.6310E−02 | 7.2880E−03 | −2.1900E−03 | 7.3300E−04 |
| S11 | −8.2320E−02 | 2.6057E−02 | −2.9200E−03 | 6.9600E−05 | 1.2600E−05 |
| S12 | −4.3460E−02 | 1.2281E−02 | −2.5000E−03 | 4.0500E−04 | −5.3000E−05 |

| Surface No. | A14 | A16 | A18 | A20 |
|---|---|---|---|---|
| S1 | 8.1710E−03 | −3.4000E−03 | 8.0900E−04 | −8.7000E−05 |
| S2 | 1.4877E−02 | −5.9000E−03 | 1.5430E−03 | −1.9000E−04 |
| S3 | 1.4787E−02 | −6.2700E−03 | 1.7490E−03 | −2.3000E−04 |
| S4 | −1.9141E−01 | 1.6152E−01 | −7.2950E−02 | 1.3903E−02 |
| S5 | −9.1536E−01 | 6.2281E−01 | −2.3566E−01 | 3.8254E−02 |
| S6 | −1.3600E−02 | 1.6510E−02 | −7.2700E−03 | 1.1790E−03 |
| S7 | 2.4079E−02 | −5.7700E−03 | 5.5500E−04 | −3.8000E−05 |
| S8 | 8.8330E−03 | −2.8700E−03 | 5.2300E−04 | −4.3000E−05 |
| S9 | −3.1800E−03 | 7.6000E−04 | −9.5000E−05 | 4.7900E−06 |
| S10 | −1.8000E−04 | 2.5100E−05 | −1.7000E−06 | 4.5400E−08 |
| S11 | −8.0000E−07 | −3.0000E−08 | 4.0200E−09 | −1.0000E−10 |
| S12 | 5.0200E−06 | −3.1000E−07 | 1.0800E−08 | −1.6000E−10 |

Figure 8A:
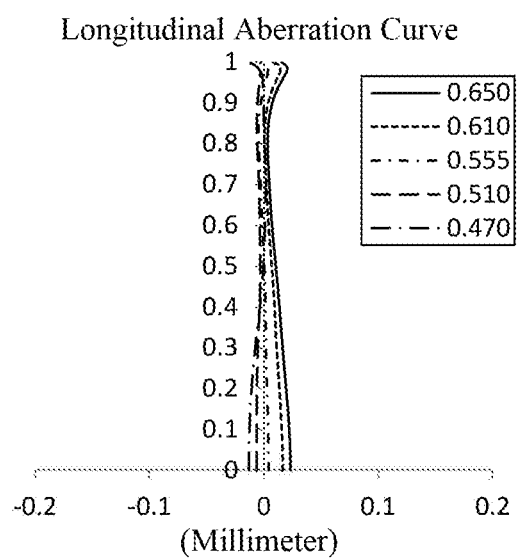
FIGS. 8A to 8D show a longitudinal aberration curve, an astigmatic curve, a distortion curve and a lateral color curve, respectively, of the optical imaging system of Example 4.
Figure 8B:
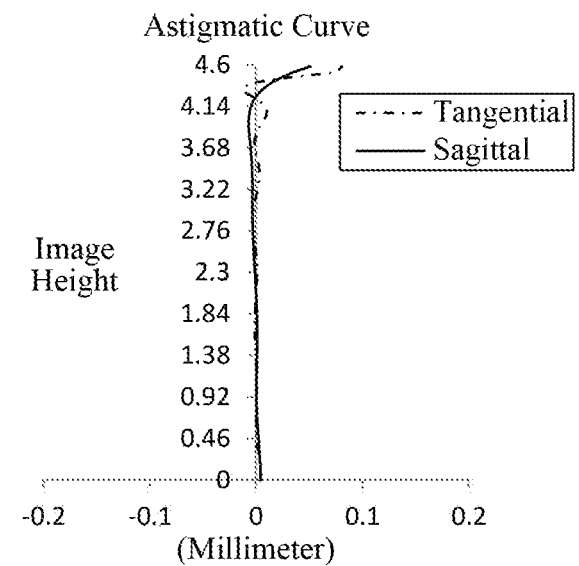
Figure 8C:
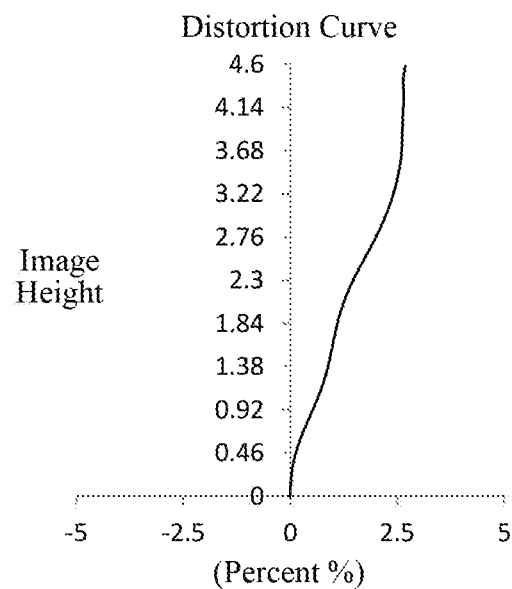
Figure 8D:
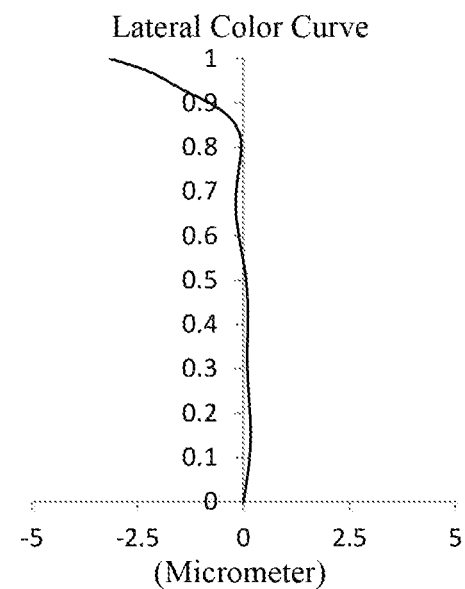

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion corresponding to different image heights. FIG. 8D illustrates a lateral color curve of the optical imaging system according to example 4, representing deviations of different image heights on an imaging plane after light passes through the optical imaging system. As can be seen from FIGS. 8A to 8D, the optical imaging lens assembly according to Example 4 can achieve good imaging quality.

EXAMPLE 5

Figure 9:
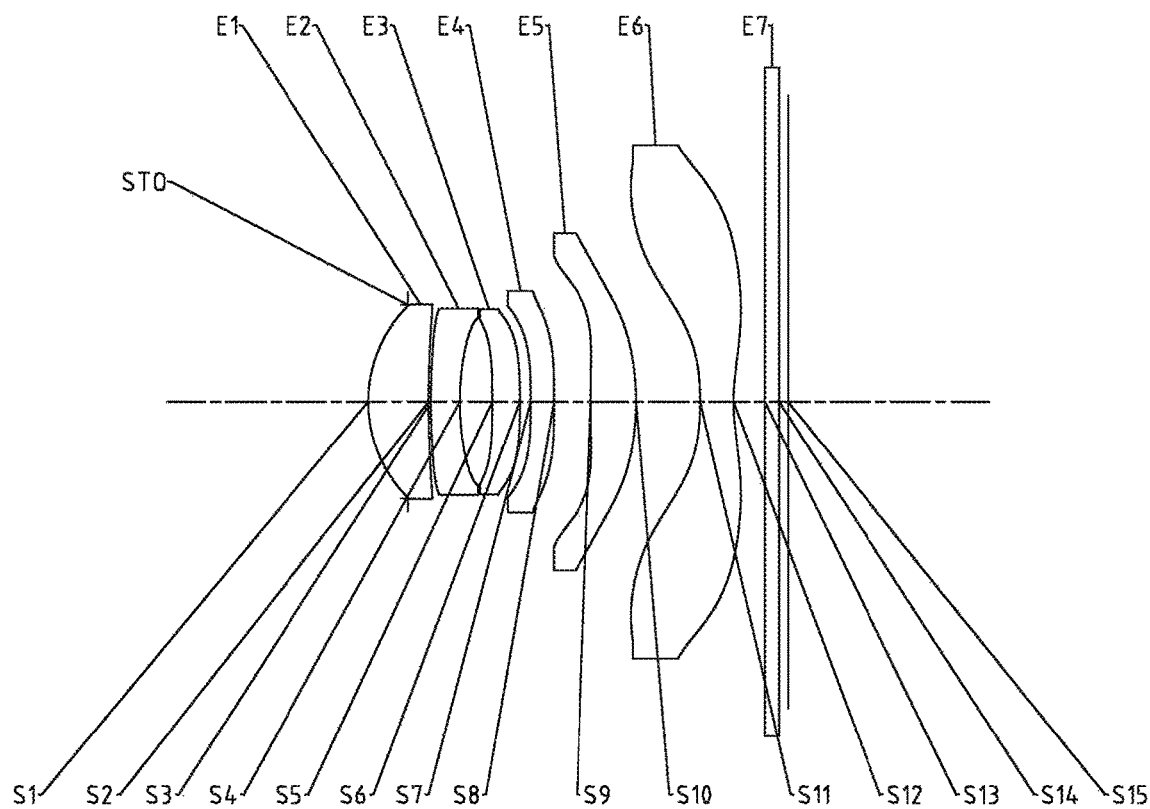
FIG. 9 is a schematic structural diagram of an optical imaging system according to Example 5 of the present disclosure.

An optical imaging system according to Example 5 of the present disclosure is described below with reference to FIGS. 9 to 10D. FIG. 9 shows a schematic structural diagram of an optical imaging system according to Example 5 of the present disclosure.

As shown in FIG. 9, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has positive refractive power, an object-side surface S5 thereof is a concave surface and an image-side surface S6 thereof is a convex surface. The fourth lens E4 has negative refractive power, an object-side surface S7 thereof is a concave surface and an image-side surface S8 thereof is a convex surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

In Example 5, an effective focal length f of the optical imaging system is 5.38 mm, a distance TTL along the optical axis from the object-side surface S1 of the first lens E1 to the imaging plane S15 is 6.25 mm, and half of a diagonal length ImgH of an effective pixel region on the imaging plane S15 is 4.55 mm.

Table 9 shows a table of basic parameters of the optical imaging system of Example 5, wherein the radius of curvature, the thickness and the focal length are all in millimeters (mm). Table 10 shows the high-order coefficients that can be applicable to each aspheric surface in Example 5, wherein each aspheric type may be defined by Equation (1) given in Example 1 above.

TABLE 9

| Surface Number | Surface type | Radius of curvature | Thickness/ Distance | Material Refractive index | Abbe Number | Focal length | Conic coefficient |
|---|---|---|---|---|---|---|---|
| OBJ | Spherical | Infinite | Infinite | | | | |
| STO | Spherical | Infinite | −0.5915 | | | | |
| S1 | Aspheric | 2.0523 | 0.8970 | 1.55 | 56.1 | 4.48 | −2.4615 |
| S2 | Aspheric | 10.7547 | 0.0350 | | | | −5.3507 |
| S3 | Aspheric | 8.4315 | 0.4313 | 1.68 | 19.2 | −12.26 | −18.5105 |
| S4 | Aspheric | 4.0972 | 0.4811 | | | | −6.1430 |
| S5 | Aspheric | −16.5347 | 0.4093 | 1.55 | 56.1 | 303.56 | −77.8887 |
| S6 | Aspheric | −15.1661 | 0.1607 | | | | −42.1714 |
| S7 | Aspheric | −31.6432 | 0.3484 | 1.67 | 20.4 | −57.14 | −99.0000 |
| S8 | Aspheric | −188.0000 | 0.5503 | | | | −99.0000 |
| S9 | Aspheric | 14.1596 | 0.6750 | 1.55 | 56.1 | 5.72 | −96.7271 |
| S10 | Aspheric | −3.9391 | 0.9544 | | | | −4.2342 |
| S11 | Aspheric | −4.7298 | 0.4949 | 1.54 | 55.9 | −3.46 | 0.0196 |
| S12 | Aspheric | 3.1634 | 0.4673 | | | | −15.4098 |
| S13 | Spherical | Infinite | 0.2100 | 1.52 | 64.2 | | |
| S14 | Spherical | Infinite | 0.1348 | | | | |
| S15 | Spherical | Infinite | | | | | |

TABLE 10

| Surface No. | A4 | A6 | A8 | A10 | A12 |
|---|---|---|---|---|---|
| S1 | 3.6681E−02 | 5.9300E−04 | −3.6700E−03 | 7.2500E−03 | −7.3500E−03 |
| S2 | −4.7150E−02 | 6.4183E−02 | −5.5070E−02 | 2.7683E−02 | 1.4380E−03 |
| S3 | −4.3920E−02 | 6.0817E−02 | −4.4350E−02 | 1.3858E−02 | 1.7006E−02 |
| S4 | 6.2100E−03 | 1.6447E−02 | −5.5000E−03 | −2.8090E−02 | 1.1017E−01 |
| S5 | −4.2520E−02 | −4.2200E−02 | 1.6000E−01 | −4.8055E−01 | 8.7286E−01 |
| S6 | −8.6210E−02 | 3.3396E−02 | −2.8920E−02 | 1.2038E−02 | 3.6500E−03 |
| S7 | −1.3032E−01 | 7.0386E−02 | −4.7670E−02 | 5.6543E−02 | −6.5420E−02 |

TABLE 10-continued

| S8 | −1.0209E−01 | 4.3970E−02 | −1.8620E−02 | 1.7965E−02 | −1.9020E−02 |
| S9 | −2.4570E−02 | −2.0540E−02 | 1.7926E−02 | −1.3180E−02 | 7.7600E−03 |
| S10 | −3.1000E−04 | −1.8330E−02 | 8.7840E−03 | −3.1000E−03 | 1.1320E−03 |
| S11 | −8.1510E−02 | 2.4938E−02 | −2.4300E−03 | −3.1000E−05 | 2.2600E−05 |
| S12 | −4.3880E−02 | 1.2668E−02 | −2.6900E−03 | 4.5800E−04 | −6.2000E−05 |

| Surface No. | A14 | A16 | A18 | A20 |
|---|---|---|---|---|
| S1 | 4.8080E−03 | −2.0300E−03 | 5.0400E−04 | −5.9000E−05 |
| S2 | −1.3540E−02 | 9.3020E−03 | −2.7900E−03 | 3.1700E−04 |
| S3 | −2.5930E−02 | 1.5887E−02 | −4.7700E−03 | 5.7200E−04 |
| S4 | −1.8106E−01 | 1.6253E−01 | −7.6810E−02 | 1.5189E−02 |
| S5 | −9.9231E−01 | 6.8634E−01 | −2.6432E−01 | 4.3711E−02 |
| S6 | −2.0910E−02 | 2.1199E−02 | −8.9600E−03 | 1.4430E−03 |
| S7 | 4.0926E−02 | −1.3770E−02 | 2.6600E−03 | −2.7000E−04 |
| S8 | 1.1227E−02 | −3.7100E−03 | 6.9300E−04 | −5.8000E−05 |
| S9 | −3.0900E−03 | 7.3000E−04 | −9.1000E−05 | 4.5100E−06 |
| S10 | −2.9000E−04 | 4.1900E−05 | −3.1000E−06 | 9.2400E−08 |
| S11 | −1.1000E−06 | −4.9000E−08 | 6.0200E−09 | −1.5000E−10 |
| S12 | 6.0700E−06 | −3.8000E−07 | 1.3500E−08 | −2.0000E−10 |

Figure 10A:
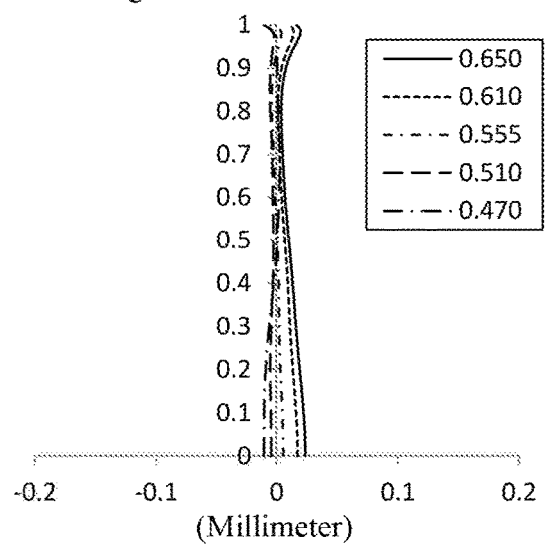
Figure 10B:
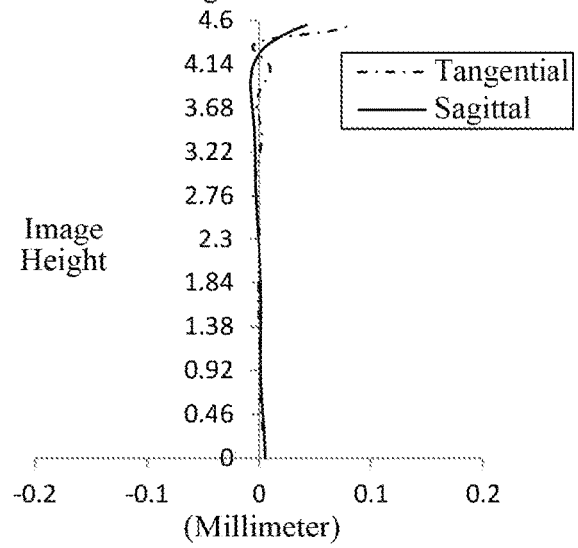

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion corresponding to different image heights. FIG. 10D illustrates a lateral color curve of the optical imaging system according to example 5, representing deviations of different image heights on an imaging plane after light passes through the optical imaging system. As can be seen from FIGS. 10A to 10D, the optical imaging lens assembly according to Example 5 can achieve good imaging quality.

EXAMPLE 6

An optical imaging system according to Example 6 of the present disclosure is described below with reference to FIGS. 11 to 12D. FIG. 11 shows a schematic structural diagram of an optical imaging system according to Example 6 of the present disclosure.

As shown in FIG. 11, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has negative refractive power, an object-side surface S5 thereof is a concave surface and an image-side surface S6 thereof is a convex surface. The fourth lens E4 has positive refractive power, an object-side surface S7 thereof is a convex surface and an image-side surface S8 thereof is a concave surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

In Example 6, an effective focal length f of the optical imaging system is 5.37 mm, a distance TTL along the optical axis from the object-side surface S1 of the first lens E1 to the imaging plane S15 is 6.26 mm, and half of a diagonal length ImgH of an effective pixel region on the imaging plane S15 is 4.57 mm.

Table 11 shows a table of basic parameters of the optical imaging system of Example 6, wherein the radius of curvature, the thickness and the focal length are all in millimeters (mm). Table 12 shows the high-order coefficients that can be applicable to each aspheric surface in Example 6, wherein each aspheric type may be defined by Equation (1) given in Example 1 above

TABLE 11

| Surface Number | Surface type | Radius of curvature | Thickness/ Distance | Material Refractive index | Material Abbe Number | Focal length | Conic coefficient |
|---|---|---|---|---|---|---|---|
| OBJ | Spherical | Infinite | Infinite | | | | |
| STO | Spherical | Infinite | −0.5735 | | | | |
| S1 | Aspheric | 2.0647 | 0.8786 | 1.55 | 56.1 | 4.42 | −2.4857 |
| S2 | Aspheric | 12.1753 | 0.0449 | | | | 7.6622 |
| S3 | Aspheric | 8.8632 | 0.4153 | 1.68 | 19.2 | −11.08 | −13.3184 |
| S4 | Aspheric | 3.9868 | 0.4862 | | | | −6.3394 |
| S5 | Aspheric | −15.4027 | 0.3847 | 1.55 | 56.1 | −62.65 | −99.0000 |
| S6 | Aspheric | −28.2691 | 0.1420 | | | | 11.4009 |

TABLE 11-continued

| Surface Number | Surface type | Radius of curvature | Thickness/ Distance | Material Refractive index | Abbe Number | Focal length | Conic coefficient |
|---|---|---|---|---|---|---|---|
| S7 | Aspheric | 11.6651 | 0.3300 | 1.67 | 20.4 | 90.54 | −94.6814 |
| S8 | Aspheric | 14.2972 | 0.5993 | | | | −81.2533 |
| S9 | Aspheric | 50.1499 | 0.7060 | 1.55 | 56.1 | 5.73 | 50.0000 |
| S10 | Aspheric | −3.3190 | 0.9453 | | | | −4.5534 |
| S11 | Aspheric | −5.1327 | 0.4929 | 1.54 | 55.9 | −3.51 | −0.0324 |
| S12 | Aspheric | 3.0824 | 0.4788 | | | | −12.0881 |
| S13 | Spherical | Infinite | 0.2100 | 1.52 | 64.2 | | |
| S14 | Spherical | Infinite | 0.1464 | | | | |
| S15 | Spherical | Infinite | | | | | |

TABLE 12

| Surface No. | A4 | A6 | A8 | A10 | A12 |
|---|---|---|---|---|---|
| S1 | 3.6186E−02 | 1.1340E−03 | −5.2100E−03 | 9.3380E−03 | −8.9000E−03 |
| S2 | −4.0120E−02 | 5.4867E−02 | −4.2440E−02 | 8.4420E−03 | 2.4822E−02 |
| S3 | −4.0800E−02 | 5.7078E−02 | −4.0080E−02 | 7.1140E−03 | 2.5595E−02 |
| S4 | 4.6780E−03 | 2.1839E−02 | −1.9900E−02 | 5.7290E−03 | 5.1019E−02 |
| S5 | −4.6780E−02 | −2.0080E−02 | 8.9096E−02 | −3.0910E−01 | 5.9567E−01 |
| S6 | −1.0944E−01 | 6.9001E−02 | −5.3920E−02 | 1.5875E−02 | 1.4987E−02 |
| S7 | −1.3777E−01 | 6.8645E−02 | −2.0330E−02 | 9.6780E−03 | −2.2620E−02 |
| S8 | −9.0840E−02 | 2.0487E−02 | 1.7180E−02 | −2.0520E−02 | 8.5160E−03 |
| S9 | −1.6070E−02 | −2.4010E−02 | 1.9272E−02 | −1.4850E−02 | 9.3390E−03 |
| S10 | 1.0480E−03 | −1.6300E−02 | 6.7710E−03 | −2.1700E−03 | 8.5800E−04 |
| S11 | −6.5640E−02 | 1.4735E−02 | 6.5100E−04 | −6.2000E−04 | 1.0000E−04 |
| S12 | −3.9810E−02 | 1.0354E−02 | −2.0200E−03 | 3.1900E−04 | −4.1000E−05 |

| Surface No. | A14 | A16 | A18 | A20 |
|---|---|---|---|---|
| S1 | 5.3480E−03 | −2.0300E−03 | 4.5000E−04 | −4.8000E−05 |
| S2 | −3.2540E−02 | 1.8913E−02 | −5.5000E−03 | 6.4000E−04 |
| S3 | −3.3190E−02 | 1.9736E−02 | −5.9100E−03 | 7.1500E−04 |
| S4 | −1.1304E−01 | 1.1403E−01 | −5.7390E−02 | 1.1849E−02 |
| S5 | −7.0354E−01 | 5.0003E−01 | −1.9640E−01 | 3.3042E−02 |
| S6 | −3.4310E−02 | 2.8760E−02 | −1.1100E−02 | 1.6700E−03 |
| S7 | 1.7110E−02 | −5.7100E−03 | 1.1400E−03 | −1.5000E−04 |
| S8 | −2.0800E−03 | 4.8800E−04 | −8.1000E−05 | 4.2800E−06 |
| S9 | −3.9000E−03 | 9.5400E−04 | −1.2000E−04 | 6.2400E−06 |
| S10 | −2.4000E−04 | 3.5100E−05 | −2.6000E−06 | 7.6300E−08 |
| S11 | −8.1000E−06 | 3.5300E−07 | −7.6000E−09 | 5.3300E−11 |
| S12 | 3.8600E−06 | −2.4000E−07 | 8.2600E−09 | −1.2000E−10 |

Figure 12A:
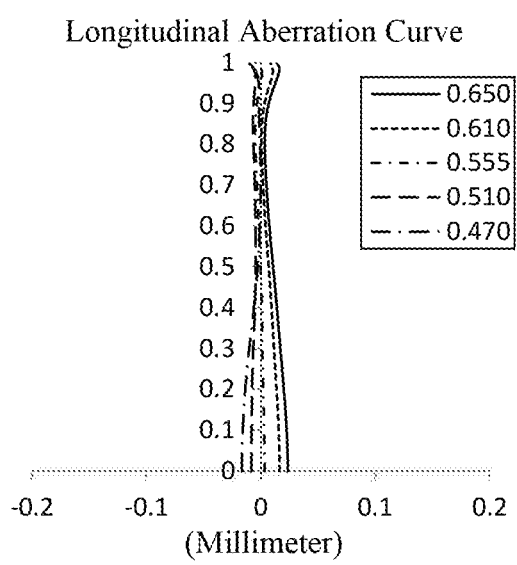
FIGS. 12A to 12D show a longitudinal aberration curve, an astigmatic curve, a distortion curve, and a lateral color curve, respectively, of the optical imaging system of Example 6.
Figure 12B:
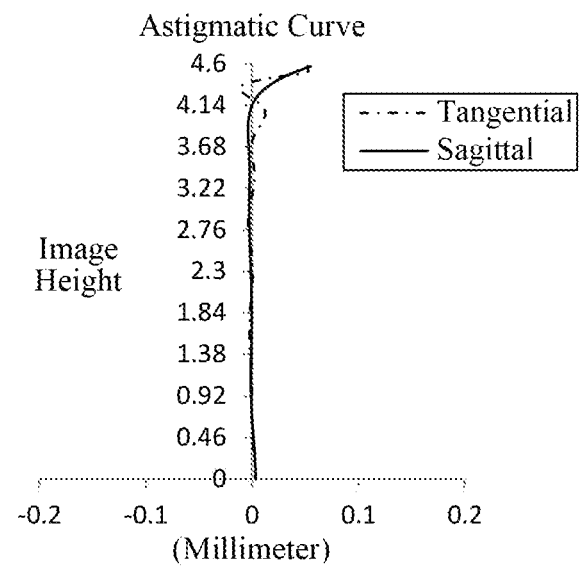
Figure 12C:
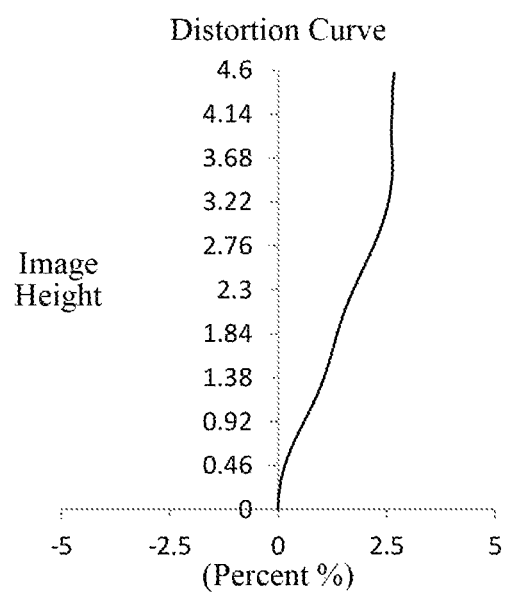
Figure 12D:
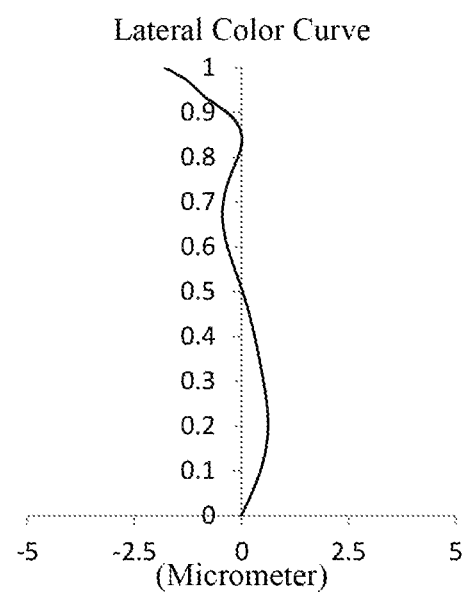

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion corresponding to different image heights. FIG. 12D illustrates a lateral color curve of the optical imaging system according to example 6, representing deviations of different image heights on an imaging plane after light passes through the optical imaging system. As can be seen from FIGS. 12A to 12D, the optical imaging lens assembly according to Example 6 can achieve good imaging quality.

EXAMPLE 7

Figure 13:
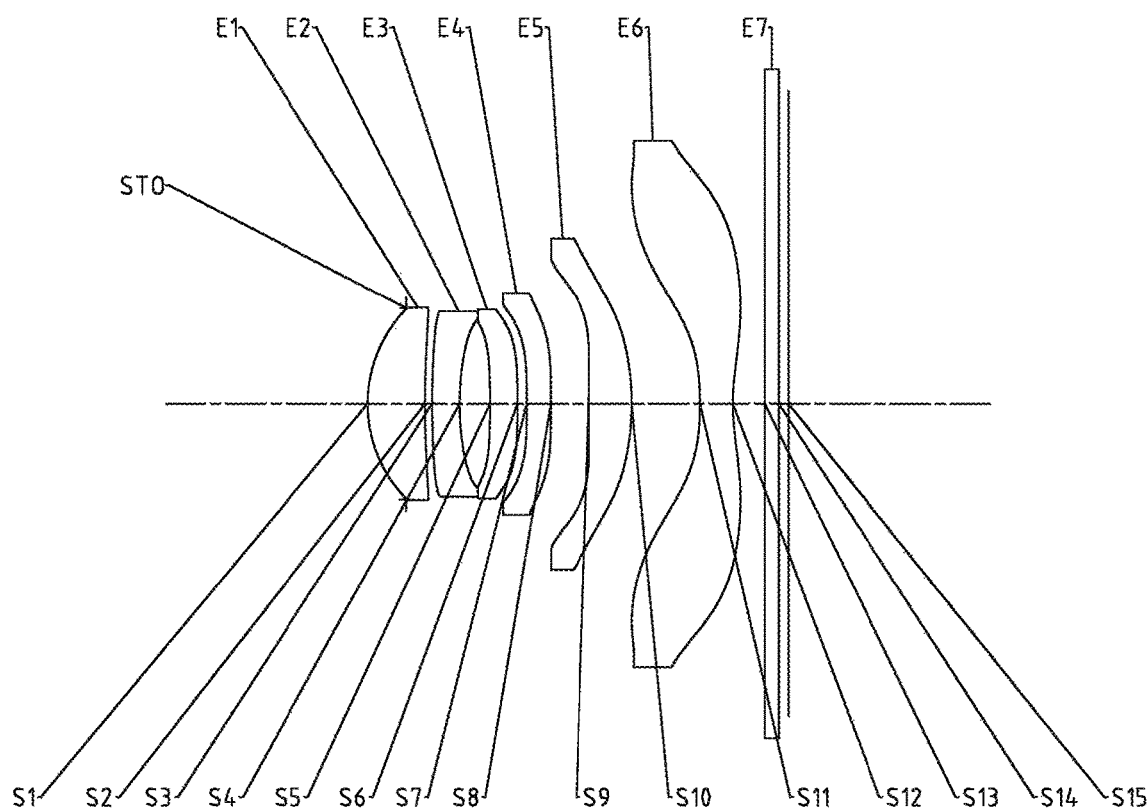
FIG. 13 shows a schematic structural diagram of an optical imaging system according to Example 7 of the present disclosure.

An optical imaging system according to Example 7 of the present disclosure is described below with reference to FIGS. 13 to 14D. FIG. 13 shows a schematic structural diagram of an optical imaging system according to Example 7 of the present disclosure.

As shown in FIG. 13, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has negative refractive power, an object-side surface S5 thereof is a concave surface and an image-side surface S6 thereof is a convex surface. The fourth lens E4 has negative refractive power, an object-side surface S7 thereof is a concave surface and an image-side surface S8 thereof is a convex surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

In Example 7, an effective focal length f of the optical imaging system is 5.41 mm, a distance TTL along the optical axis from the object-side surface S1 of the first lens E1 to the imaging plane S15 is 6.27 mm, and half of a diagonal length ImgH of an effective pixel region on the imaging plane S15 is 4.65 mm.

Table 13 shows a table of basic parameters of the optical imaging system of Example 7, wherein the radius of curvature, the thickness and the focal length are all in millimeters (mm). Table 14 shows the high-order coefficients that can be applicable to each aspheric surface in Example 7, wherein each aspheric type may be defined by Equation (1) given in Example 1 above.

TABLE 13

| Surface Number | Surface type | Radius of curvature | Thickness/ Distance | Refractive index | Abbe Number | Focal length | Conic coefficient |
|---|---|---|---|---|---|---|---|
| OBJ | Spherical | Infinite | Infinite | | | | |
| STO | Spherical | Infinite | −0.5748 | | | | |
| S1 | Aspheric | 2.0384 | 0.8530 | 1.55 | 56.1 | 4.39 | −2.4622 |
| S2 | Aspheric | 11.6331 | 0.1069 | | | | −2.4242 |
| S3 | Aspheric | 10.1378 | 0.4094 | 1.68 | 19.2 | −10.76 | −13.1735 |
| S4 | Aspheric | 4.1706 | 0.4500 | | | | −6.6647 |
| S5 | Aspheric | −20.9947 | 0.4082 | 1.55 | 56.1 | −120.11 | −4.6045 |
| S6 | Aspheric | −31.0941 | 0.1371 | | | | −71.6299 |
| S7 | Aspheric | −261.6460 | 0.3613 | 1.67 | 20.4 | −588.54 | 50.0000 |
| S8 | Aspheric | −786.3510 | 0.5683 | | | | 50.0000 |
| S9 | Aspheric | 16.6836 | 0.6385 | 1.55 | 56.1 | 5.92 | −71.5979 |
| S10 | Aspheric | −3.9520 | 1.0169 | | | | −4.3849 |
| S11 | Aspheric | −5.0954 | 0.4867 | 1.54 | 55.9 | −3.61 | 0.1592 |
| S12 | Aspheric | 3.2264 | 0.4758 | | | | −14.9360 |
| S13 | Spherical | Infinite | 0.2100 | 1.52 | 64.2 | | |
| S14 | Spherical | Infinite | 0.1434 | | | | |
| S15 | Spherical | Infinite | | | | | |

TABLE 14

| Surface No. | A4 | A6 | A8 | A10 | A12 |
|---|---|---|---|---|---|
| S1 | 3.6684E−02 | 2.8700E−03 | −1.0800E−02 | 1.9352E−02 | −2.0210E−02 |
| S2 | −2.4300E−02 | 1.7295E−02 | 2.4670E−03 | −2.6640E−02 | 4.1513E−02 |
| S3 | −3.3260E−02 | 3.2541E−02 | −1.0260E−02 | −5.5800E−03 | 1.6590E−02 |
| S4 | −4.3000E−04 | 1.5518E−02 | 2.8795E−02 | −1.0931E−01 | 2.2092E−01 |
| S5 | −4.6620E−02 | −3.1720E−02 | 1.2984E−01 | −4.1361E−01 | 7.7765E−01 |
| S6 | −9.2250E−02 | 3.8619E−02 | −4.7020E−02 | 5.7997E−02 | −6.2700E−02 |
| S7 | −1.2796E−01 | 6.3824E−02 | −4.9460E−02 | 6.6265E−02 | −7.4470E−02 |
| S8 | −9.5420E−02 | 3.3585E−02 | −1.0840E−02 | 1.1355E−02 | −1.3190E−02 |
| S9 | −2.5990E−02 | −1.7900E−02 | 1.3793E−02 | −1.0300E−02 | 6.3470E−03 |
| S10 | −5.5000E−05 | −1.5660E−02 | 6.5240E−03 | −2.1300E−03 | 7.9300E−04 |
| S11 | −7.5820E−02 | 2.4301E−02 | −2.9700E−03 | 9.7600E−05 | 1.7600E−05 |
| S12 | −4.0400E−02 | 1.0721E−02 | −1.9200E−03 | 2.4400E−04 | −2.4000E−05 |

| Surface No. | A14 | A16 | A18 | A20 |
|---|---|---|---|---|
| S1 | 1.3395E−02 | −5.5400E−03 | 1.3070E−03 | −1.4000E−04 |
| S2 | −3.5900E−02 | 1.8126E−02 | −4.9600E−03 | 5.6400E−04 |
| S3 | −1.7640E−02 | 1.0677E−02 | −3.4400E−03 | 4.5800E−04 |
| S4 | −2.7080E−01 | 2.0240E−01 | −8.4250E−02 | 1.5157E−02 |
| S5 | −9.0144E−01 | 6.3019E−01 | −2.4391E−01 | 4.0350E−02 |
| S6 | 4.0870E−02 | −1.4830E−02 | 2.8080E−03 | −1.9000E−04 |
| S7 | 4.7203E−02 | −1.7260E−02 | 3.7550E−03 | −4.0000E−04 |
| S8 | 7.9920E−03 | −2.7200E−03 | 5.3200E−04 | −4.7000E−05 |
| S9 | −2.5700E−03 | 6.1300E−04 | −7.6000E−05 | 3.8100E−06 |
| S10 | −2.0000E−04 | 2.6400E−05 | −1.7000E−06 | 4.1100E−08 |
| S11 | −2.5000E−06 | 1.4800E−07 | −4.2000E−09 | 4.8300E−11 |
| S12 | 1.7900E−06 | −9.2000E−08 | 2.8800E−09 | −4.1000E−11 |

Figures 14A, 14B:
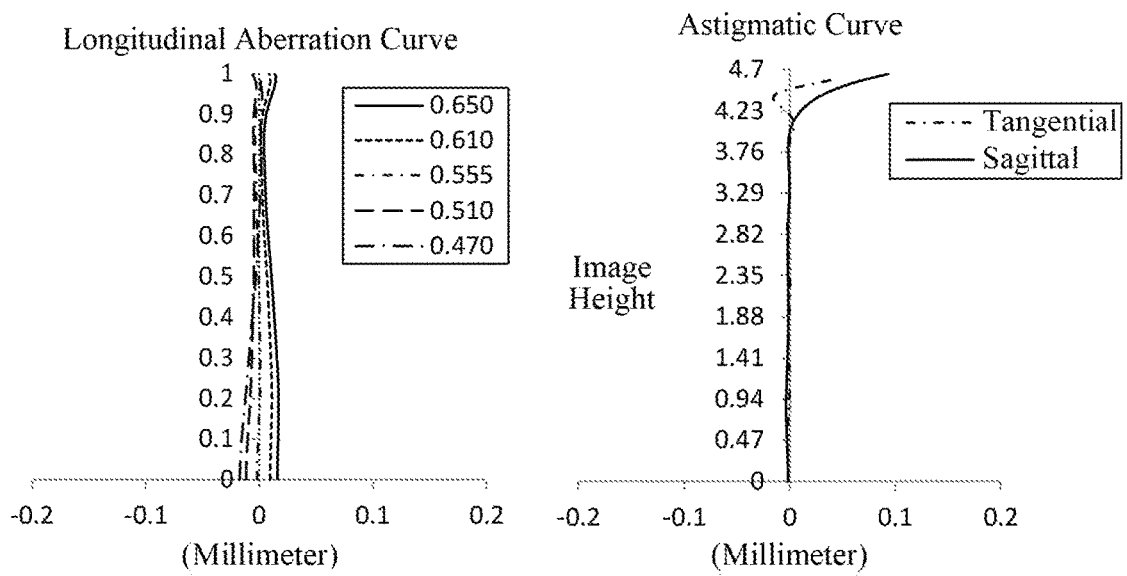
FIGS. 14A to 14D show a longitudinal aberration curve, an astigmatic curve, a distortion curve, and a lateral color curve, respectively, of the optical imaging system of Example 7.
Figure 14C:
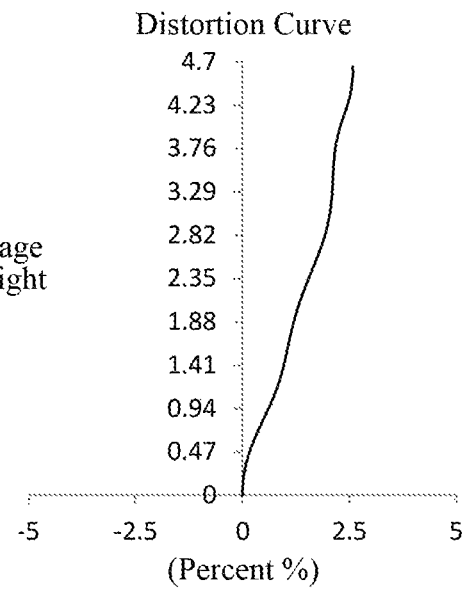
Figure 14D:
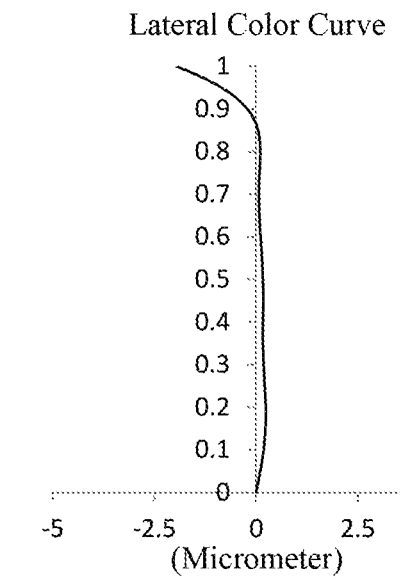

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion corresponding to different image heights. FIG. 14D illustrates a lateral color curve of the optical imaging system according to example 7, representing deviations of different image heights on an imaging plane after light passes through the optical imaging system. As can be seen from FIGS. 14A to 14D, the optical imaging lens assembly according to Example 7 can achieve good imaging quality.

EXAMPLE 8

Figure 15:
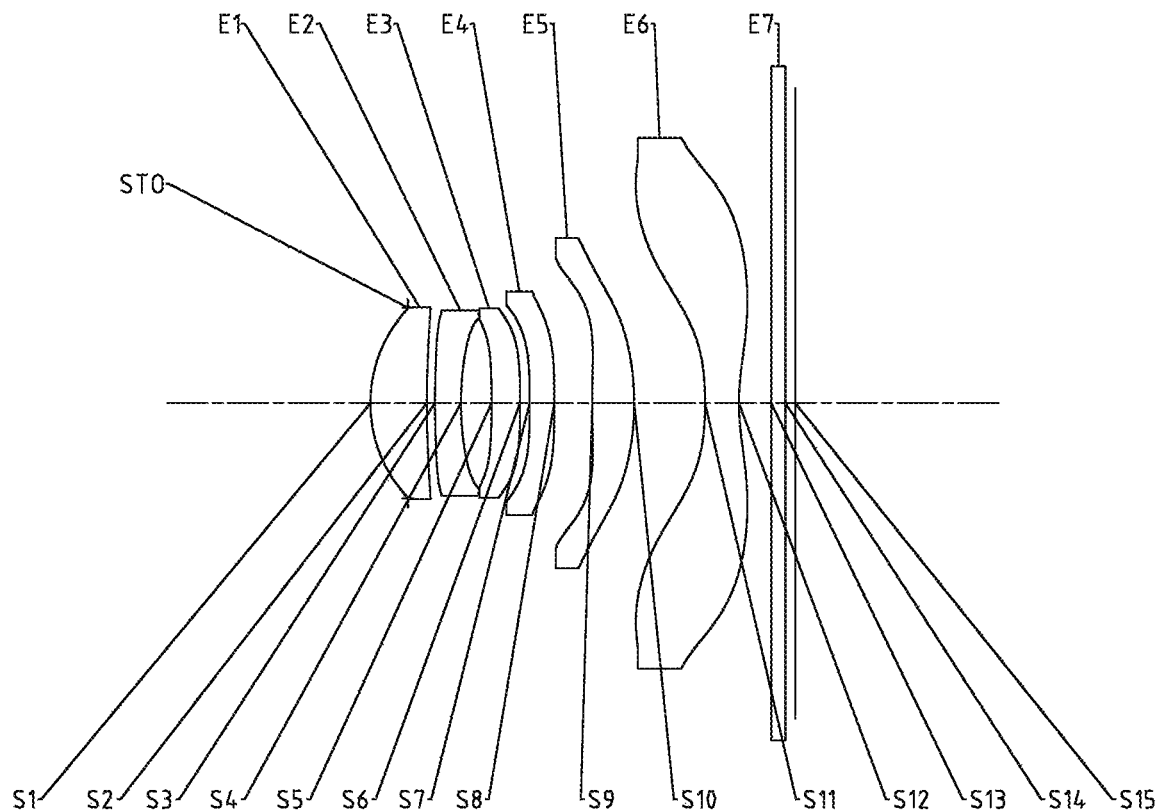
FIG. 15 shows a schematic structural diagram of an optical imaging system according to Example 8 of the present disclosure.

An optical imaging system according to Example 8 of the present disclosure is described below with reference to FIGS. 15 to 16D. FIG. 15 shows a schematic structural diagram of an optical imaging system according to Example 8 of the present disclosure.

As shown in FIG. 15, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has negative refractive power, an object-side surface S5 thereof is a concave surface and an image-side surface S6 thereof is a convex surface. The fourth lens E4 has negative refractive power, an object-side surface S7 thereof is a concave surface and an image-side surface S8 thereof is a concave surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

In Example 8, an effective focal length f of the optical imaging system is 5.39 mm, a distance TTL along the optical axis from the object-side surface S1 of the first lens E1 to the imaging plane S15 is 6.28 mm, and half of a diagonal length ImgH of an effective pixel region on the imaging plane S15 is 4.66 mm.

Table 15 shows a table of basic parameters of the optical imaging system of Example 8, wherein the radius of curvature, the thickness and the focal length are all in millimeters (mm). Table 16 shows the high-order coefficients that can be applicable to each aspheric surface in Example 8, wherein each aspheric type may be defined by Equation (1) given in Example 1 above.

TABLE 15

| Surface Number | Surface type | Radius of curvature | Thickness/Distance | Material Refractive index | Abbe Number | Focal length | Conic coefficient |
|---|---|---|---|---|---|---|---|
| OBJ | Spherical | Infinite | Infinite | | | | |
| STO | Spherical | Infinite | −0.5565 | | | | |
| S1 | Aspheric | 2.0571 | 0.8325 | 1.55 | 56.1 | 4.42 | −2.4966 |
| S2 | Aspheric | 11.9867 | 0.1206 | | | | 2.4844 |
| S3 | Aspheric | 11.0370 | 0.3850 | 1.68 | 19.2 | −10.73 | −5.0173 |
| S4 | Aspheric | 4.3203 | 0.4518 | | | | −7.3099 |
| S5 | Aspheric | −24.8937 | 0.4197 | 1.55 | 56.1 | −150.16 | 14.3793 |
| S6 | Aspheric | −35.9624 | 0.1427 | | | | 22.2224 |
| S7 | Aspheric | −327.6880 | 0.3639 | 1.67 | 20.4 | −240.04 | 50.0000 |
| S8 | Aspheric | 312.7036 | 0.5622 | | | | 49.9990 |
| S9 | Aspheric | 16.0431 | 0.6201 | 1.55 | 56.1 | 5.77 | −36.6538 |
| S10 | Aspheric | −3.8656 | 1.0468 | | | | −4.8641 |
| S11 | Aspheric | −5.2505 | 0.5005 | 1.54 | 55.9 | −3.63 | 0.3401 |
| S12 | Aspheric | 3.2021 | 0.4784 | | | | −12.0127 |
| S13 | Spherical | Infinite | 0.2100 | 1.52 | 64.2 | | |
| S14 | Spherical | Infinite | 0.1459 | | | | |
| S15 | Spherical | Infinite | | | | | |

TABLE 16

| Surface No. | A4 | A6 | A8 | A10 | A12 |
|---|---|---|---|---|---|
| S1 | 3.6633E−02 | 1.2040E−03 | −6.4700E−03 | 1.2300E−02 | −1.3030E−02 |
| S2 | −2.0980E−02 | 1.5635E−02 | −8.6000E−04 | −1.7910E−02 | 3.0732E−02 |
| S3 | −3.1540E−02 | 3.0769E−02 | −5.4900E−03 | −1.7950E−02 | 3.5867E−02 |
| S4 | −2.6400E−03 | 2.2353E−02 | 4.9630E−03 | −5.1620E−02 | 1.2952E−01 |
| S5 | −4.8400E−02 | −3.2950E−02 | 1.3640E−01 | −4.1889E−01 | 7.6698E−01 |
| S6 | −9.4190E−02 | 3.0979E−02 | −2.3020E−02 | 2.1199E−02 | −2.1950E−02 |
| S7 | −1.2802E−01 | 5.1495E−02 | −2.5440E−02 | 4.6269E−02 | −6.5770E−02 |

TABLE 16-continued

| | | | | | |
|---|---|---|---|---|---|
| S8  | −9.4420E−02 | 2.6362E−02  | −1.3200E−03 | 6.4340E−03  | −1.3200E−02 |
| S9  | −2.0630E−02 | −2.2990E−02 | 1.6498E−02  | −1.1550E−02 | 7.0690E−03  |
| S10 | 4.2250E−03  | −1.8290E−02 | 6.4550E−03  | −1.6900E−03 | 6.7800E−04  |
| S11 | −6.4550E−02 | 1.3646E−02  | 1.1830E−03  | −8.1000E−04 | 1.3800E−04  |
| S12 | −3.8410E−02 | 8.9590E−03  | −1.3700E−03 | 1.4600E−04  | −1.3000E−05 |

| Surface No. | A14 | A16 | A18 | A20 |
|---|---|---|---|---|
| S1  | 8.7680E−03  | −3.7000E−03 | 9.0000E−04  | −9.9000E−05 |
| S2  | −2.7890E−02 | 1.4578E−02  | −4.1100E−03 | 4.7900E−04  |
| S3  | −3.5500E−02 | 2.0531E−02  | −6.4400E−03 | 8.4600E−04  |
| S4  | −1.7817E−01 | 1.4443E−01  | −6.3820E−02 | 1.2042E−02  |
| S5  | −8.7180E−01 | 6.0037E−01  | −2.2945E−01 | 3.7545E−02  |
| S6  | 8.2560E−03  | 2.2410E−03  | −2.2200E−03 | 4.2200E−04  |
| S7  | 4.4992E−02  | −1.6790E−02 | 3.6560E−03  | −3.9000E−04 |
| S8  | 9.1310E−03  | −3.2600E−03 | 6.4100E−04  | −5.5000E−05 |
| S9  | −2.9100E−03 | 7.0500E−04  | −8.9000E−05 | 4.5100E−06  |
| S10 | −2.0000E−04 | 3.0000E−05  | −2.2000E−06 | 6.4000E−08  |
| S11 | −1.2000E−05 | 6.5100E−07  | −1.8000E−08 | 2.2000E−10  |
| S12 | 9.4100E−07  | −5.5000E−08 | 2.0700E−09  | −3.5000E−11 |

Figure 16A:
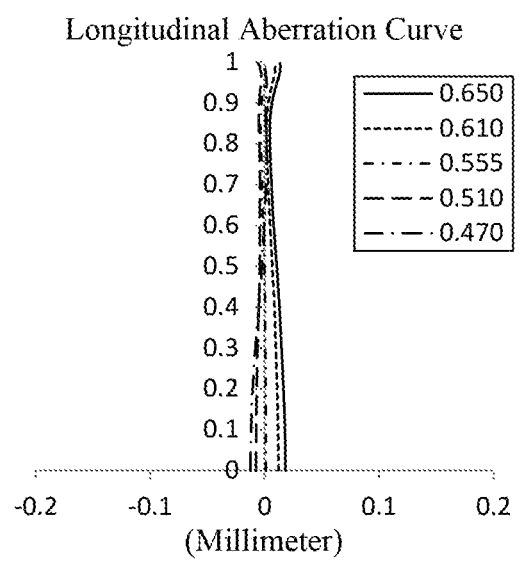
FIGS. 16A to 16D show a longitudinal aberration curve, an astigmatic curve, a distortion curve, and a lateral color curve, respectively, of the optical imaging system of Example 8.
Figure 16B:
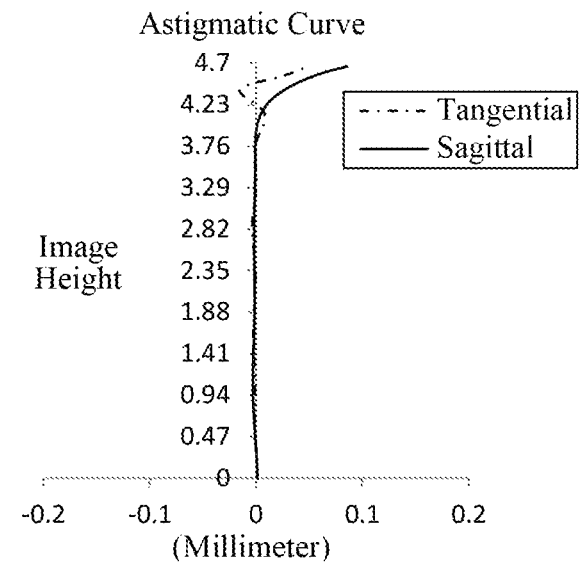
Figure 16C:
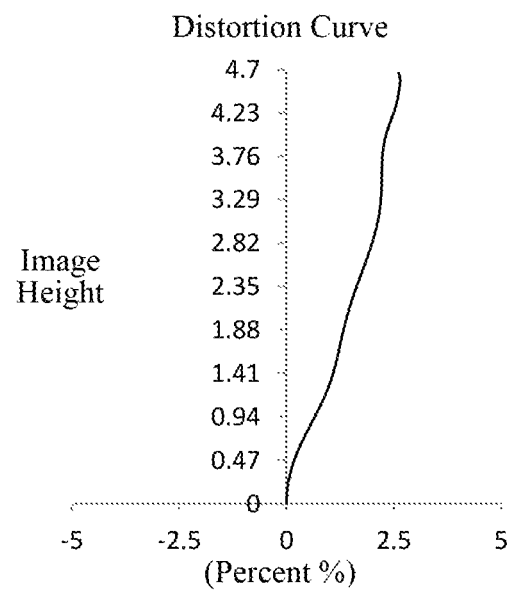
Figure 16D:
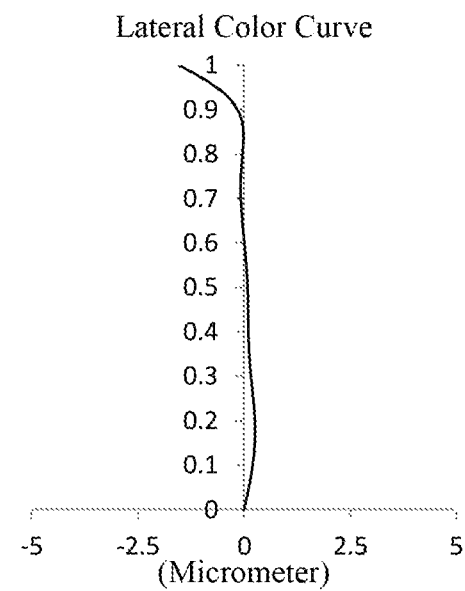

FIG. 16A illustrates a longitudinal aberration curve of the optical imaging system according to example 8, representing deviations of focal points converged by light of different wavelengths after passing through the optical imaging system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion corresponding to different image heights. FIG. 16D illustrates a lateral color curve of the optical imaging system according to example 8, representing deviations of different image heights on an imaging plane after light passes through the optical imaging system. As can be seen from FIGS. 16A to 16D, the optical imaging lens assembly according to Example 8 can achieve good imaging quality.

EXAMPLE 9

Figure 17:
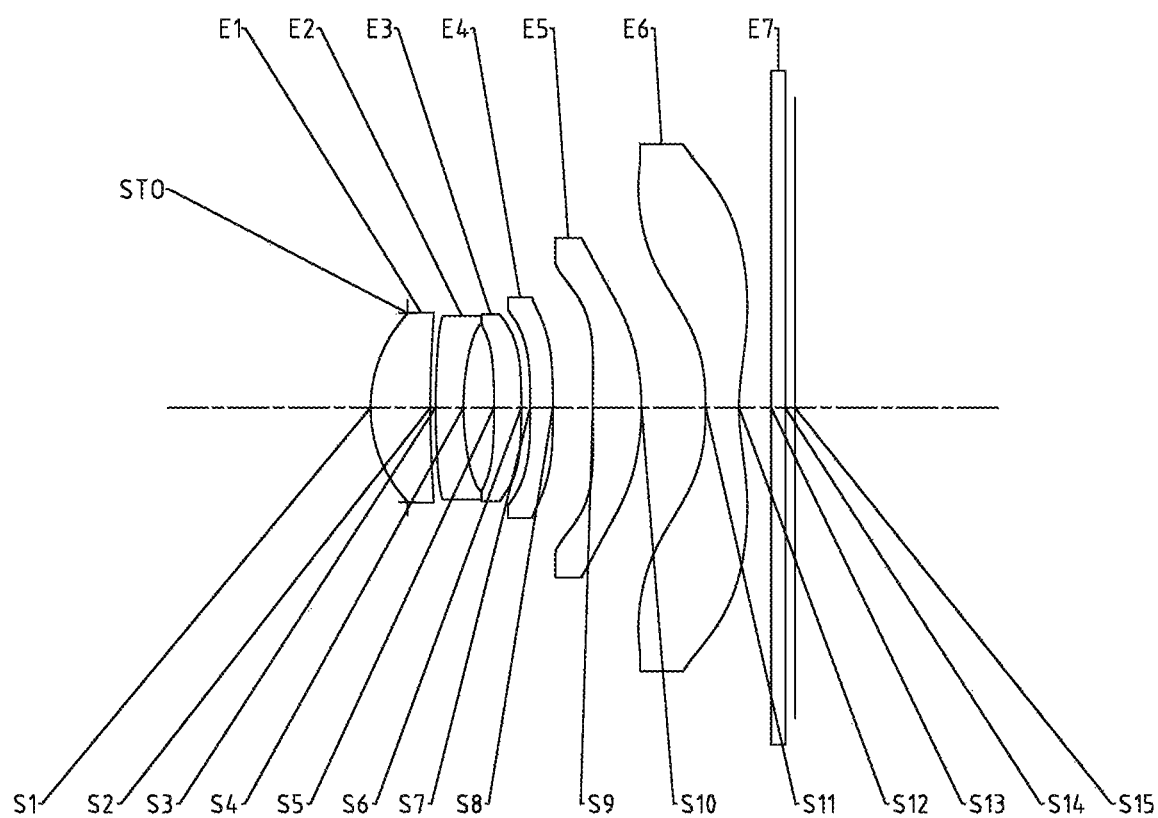
FIG. 17 is a schematic structural diagram of an optical imaging system according to Example 9 of the present disclosure.

An optical imaging system according to Example 9 of the present disclosure is described below with reference to FIGS. 17 to 18D. FIG. 17 shows a schematic structural diagram of an optical imaging system according to Example 9 of the present disclosure.

As shown in FIG. 17, the optical imaging system sequentially includes a stop STO, a first lens E1, a second lens E2, a third lens E3, a fourth lens E4, a fifth lens E5, a sixth lens E6, and an optical filter E7 from an object side to an image side along an optical axis.

The first lens E1 has positive refractive power, an object-side surface S1 thereof is a convex surface and an image-side surface S2 thereof is a concave surface. The second lens E2 has negative refractive power, an object-side surface S3 thereof is a convex surface and an image-side surface S4 thereof is a concave surface. The third lens E3 has negative refractive power, an object-side surface S5 thereof is a concave surface and an image-side surface S6 thereof is a convex surface. The fourth lens E4 has positive refractive power, an object-side surface S7 thereof is a concave surface and an image-side surface S8 thereof is a convex surface. The fifth lens E5 has positive refractive power, an object-side surface S9 thereof is a convex surface and an image-side surface S10 thereof is a convex surface. The sixth lens E6 has negative refractive power, an object-side surface S11 thereof is a concave surface and an image-side surface S12 thereof is a concave surface. The filter E7 has an object-side surface S13 and an image-side surface S14. The optical imaging system has an imaging plane S15. Light from an object sequentially passes through each of the surfaces S1 to S14 and is finally imaged on the imaging plane S15.

In Example 9, an effective focal length f of the optical imaging system is 5.37 mm, a distance TTL along the optical axis from the object-side surface S1 of the first lens E1 to the imaging plane S15 is 6.28 mm, and half of a diagonal length ImgH of an effective pixel region on the imaging plane S15 is 4.58 mm.

Table 17 shows a table of basic parameters of the optical imaging system of Example 9, wherein the radius of curvature, the thickness and the focal length are all in millimeters (mm). Table 18 shows the high-order coefficients that can be applicable to each aspheric surface in Example 9, wherein each aspheric type may be defined by Equation (1) given in Example 1 above.

TABLE 17

| | | | | Material | | | |
|---|---|---|---|---|---|---|---|
| Surface Number | Surface type | Radius of curvature | Thickness/ Distance | Refractive index | Abbe Number | Focal length | Conic coefficient |
| OBJ | Spherical | Infinite | Infinite | | | | |
| STO | Spherical | Infinite | −0.5472 | | | | |
| S1  | Aspheric | 2.0559   | 0.8822 | 1.55 | 56.1 | 4.42    | −2.4903  |
| S2  | Aspheric | 11.7800  | 0.0796 |      |      |         | −0.8711  |
| S3  | Aspheric | 9.2387   | 0.4124 | 1.68 | 19.2 | −10.88  | −16.7866 |
| S4  | Aspheric | 4.0253   | 0.4524 |      |      |         | −6.6978  |
| S5  | Aspheric | −18.5484 | 0.4045 | 1.55 | 56.1 | −439.13 | −46.5727 |
| S6  | Aspheric | −20.2586 | 0.1291 |      |      |         | 32.4287  |

TABLE 17-continued

| Surface Number | Surface type | Radius of curvature | Thickness/ Distance | Material Refractive index | Abbe Number | Focal length | Conic coefficient |
|---|---|---|---|---|---|---|---|
| S7 | Aspheric | −473.9130 | 0.3356 | 1.67 | 20.4 | 890.38 | −99.0000 |
| S8 | Aspheric | −263.5570 | 0.5923 | | | | 50.0000 |
| S9 | Aspheric | 22.6495 | 0.7204 | 1.55 | 56.1 | 5.95 | −65.3350 |
| S10 | Aspheric | −3.7501 | 0.9501 | | | | −4.5926 |
| S11 | Aspheric | −5.0396 | 0.4927 | 1.54 | 55.9 | −3.59 | 0.0336 |
| S12 | Aspheric | 3.2209 | 0.4758 | | | | −11.2714 |
| S13 | Spherical | Infinite | 0.2100 | 1.52 | 64.2 | | |
| S14 | Spherical | Infinite | 0.1434 | | | | |
| S15 | Spherical | Infinite | | | | | |

15

TABLE 18

| Surface No. | A4 | A6 | A8 | A10 | A12 |
|---|---|---|---|---|---|
| S1 | 3.6125E−02 | 3.2580E−03 | −1.2390E−02 | 2.2547E−02 | −2.4100E−02 |
| S2 | −3.1420E−02 | 2.8927E−02 | −9.6400E−03 | −1.3740E−02 | 2.9426E−02 |
| S3 | −3.7480E−02 | 3.9332E−02 | −1.1040E−02 | −1.9330E−02 | 4.3941E−02 |
| S4 | 1.3710E−03 | 1.3346E−02 | 3.6353E−02 | −1.3809E−01 | 2.7746E−01 |
| S5 | −4.4050E−02 | −4.6390E−02 | 1.9454E−01 | −6.0508E−01 | 1.1347E+00 |
| S6 | −8.9020E−02 | 9.1710E−03 | 5.6244E−02 | −1.4567E−01 | 2.0132E−01 |
| S7 | −1.2677E−01 | 4.2090E−02 | 1.4141E−02 | −3.0950E−02 | 3.1016E−02 |
| S8 | −9.1700E−02 | 2.6423E−02 | −1.6800E−03 | 8.8670E−03 | −1.7050E−02 |
| S9 | −2.3330E−02 | −1.8080E−02 | 1.2256E−02 | −8.4500E−03 | 5.5330E−03 |
| S10 | 9.9300E−04 | −1.6510E−02 | 6.5310E−03 | −1.9300E−03 | 7.7000E−04 |
| S11 | −6.3940E−02 | 1.1903E−02 | 2.2660E−03 | −1.0900E−03 | 1.7900E−04 |
| S12 | −4.0740E−02 | 1.0061E−02 | −1.7300E−03 | 2.2700E−04 | −2.5000E−05 |

| Surface No. | A14 | A16 | A18 | A20 |
|---|---|---|---|---|
| S1 | 1.6305E−02 | −6.8300E−03 | 1.6180E−03 | −1.7000E−04 |
| S2 | −2.7990E−02 | 1.5044E−02 | −4.3500E−03 | 5.1800E−04 |
| S3 | −4.5660E−02 | 2.7334E−02 | −8.8500E−03 | 1.1960E−03 |
| S4 | −3.3742E−01 | 2.4986E−01 | −1.0327E−01 | 1.8456E−02 |
| S5 | −1.3213E+00 | 9.2930E−01 | −3.6156E−01 | 5.9969E−02 |
| S6 | −1.8655E−01 | 1.0791E−01 | −3.4230E−02 | 4.5440E−03 |
| S7 | −3.6930E−02 | 2.6724E−02 | −9.0900E−03 | 1.1580E−03 |
| S8 | 1.1435E−02 | −3.8400E−03 | 6.9000E−04 | −5.4000E−05 |
| S9 | −2.4600E−03 | 6.3200E−04 | −8.3000E−05 | 4.3200E−06 |
| S10 | −2.2000E−04 | 3.4600E−05 | −2.7000E−06 | 8.5200E−08 |
| S11 | −1.6000E−05 | 8.7000E−07 | −2.6000E−08 | 3.2400E−10 |
| S12 | 2.2400E−06 | −1.4000E−07 | 4.7400E−09 | −7.1000E−11 |

Figures 18A, 18B:
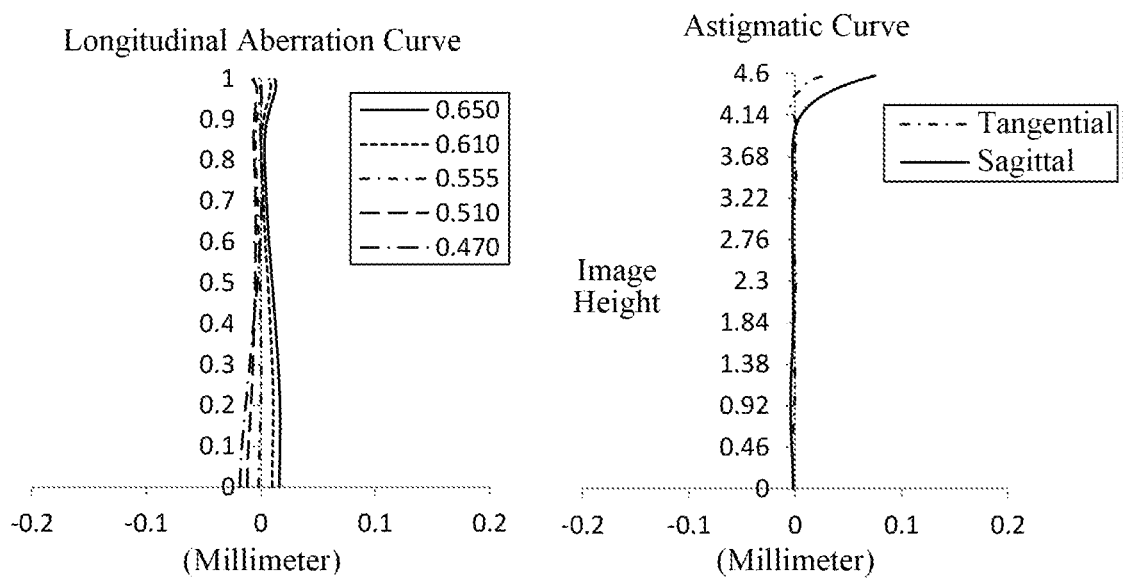
FIGS. 18A to 18D show a longitudinal aberration curve, an astigmatic curve, a distortion curve, and a lateral color curve, respectively, of the optical imaging system of Example 9.
Figures 18C, 18D:
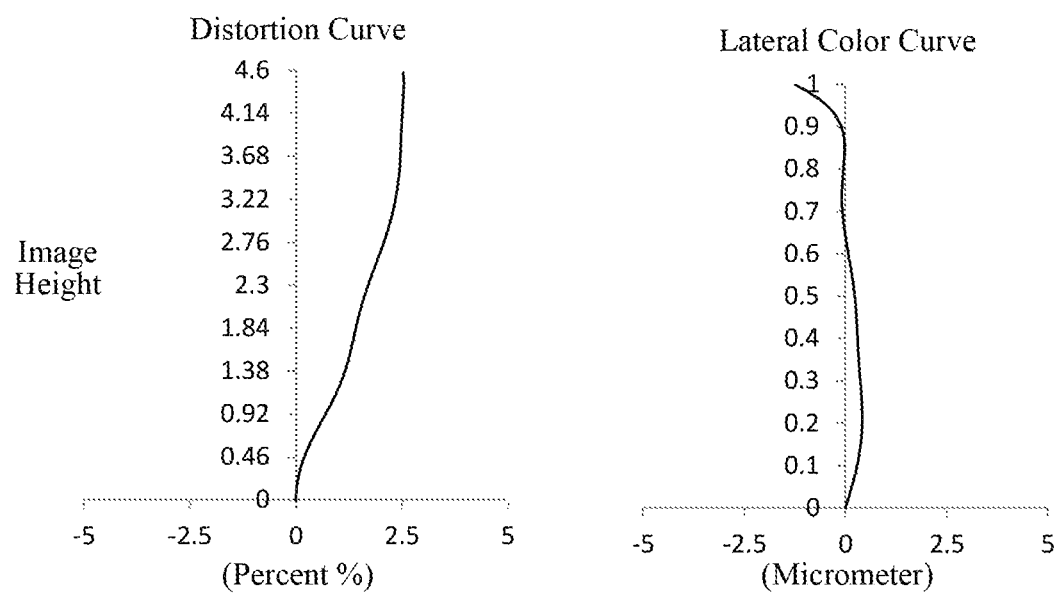

FIG. 18A illustrates a longitudinal aberration curve of the optical imaging system according to example 9, representing deviations of focal points converged by light of different wavelengths after passing through the optical imaging system. FIG. 18B illustrates an astigmatic curve of the optical imaging system according to example 9, representing a curvature of a tangential plane and a curvature of a sagittal plane. FIG. 18C illustrates a distortion curve of the optical imaging system according to example 9, representing amounts of distortion corresponding to different image heights. FIG. 18D illustrates a lateral color curve of the optical imaging system according to example 9, representing deviations of different image heights on an imaging plane after light passes through the optical imaging system. As can be seen from FIGS. 18A to 18D, the optical imaging lens assembly according to Example 9 can achieve good imaging quality.

In view of the above, Examples 1 to 9 satisfy the relationships shown in Table 19, respectively.

TABLE 19

| | Example | | | | | | | | |
|---|---|---|---|---|---|---|---|---|---|
| Conditional | 1 | 2 | 3 | 4 | 5 | 6 | 7 | 8 | 9 |
| f*tan(Semi-FOV) (mm) | 4.63 | 4.58 | 4.51 | 4.47 | 4.44 | 4.46 | 4.53 | 4.54 | 4.46 |
| TTL*f/(ImgH*EPD) | 2.43 | 2.56 | 2.53 | 2.51 | 2.56 | 2.58 | 2.56 | 2.58 | 2.64 |
| SAG21/T12 | 3.40 | −0.50 | 0.95 | 3.12 | 3.50 | 2.61 | 1.00 | 0.86 | 1.32 |
| T56/TTL*10 | 1.54 | 1.69 | 1.63 | 1.54 | 1.53 | 1.51 | 1.62 | 1.67 | 1.51 |
| T56/CT6 | 1.96 | 1.89 | 2.12 | 1.97 | 1.93 | 1.92 | 2.09 | 2.09 | 1.93 |
| f5/f | 1.09 | 1.10 | 1.11 | 1.07 | 1.06 | 1.07 | 1.09 | 1.07 | 1.11 |

TABLE 19-continued

| Conditional | Example | | | | | | | | |
|---|---|---|---|---|---|---|---|---|---|
| | 1 | 2 | 3 | 4 | 5 | 6 | 7 | 8 | 9 |
| f6/R11 | 0.73 | 0.73 | 0.72 | 0.73 | 0.73 | 0.68 | 0.71 | 0.69 | 0.71 |
| f5 (mm) | 5.90 | 5.95 | 5.99 | 5.77 | 5.72 | 5.73 | 5.92 | 5.77 | 5.95 |
| f/(f1 − f2) | 0.33 | 0.43 | 0.37 | 0.33 | 0.32 | 0.35 | 0.36 | 0.36 | 0.35 |
| R12/f | 0.58 | 0.56 | 0.60 | 0.59 | 0.59 | 0.57 | 0.60 | 0.59 | 0.60 |
| (R9 + R10)/(R9 − R10) | 0.49 | 0.32 | 0.54 | 0.60 | 0.56 | 0.88 | 0.62 | 0.61 | 0.72 |

The present disclosure also provides an imaging device provided with an electronic photosensitive element for imaging, which may be a photosensitive Charge-Coupled Device (CCD) or a Complementary Metal-Oxide Semiconductor element (CMOS). The imaging device may be an independent imaging device such as a digital camera, or may be an imaging module integrated on a mobile electronic device such as a mobile phone. The imaging device is equipped with the optical imaging system described above.

The foregoing is only a description of the preferred examples of the present disclosure and the applied technical principles. It should be appreciated by those skilled in the art that the protected scope of the present disclosure is not limited to the technical solutions formed by the particular combinations of the above technical features. The protected scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:
   a first lens having positive refractive power;
   a second lens having negative refractive power;
   a third lens having refractive power with an object-side surface being concave and an image-side surface being convex;
   a fourth lens having refractive power;
   a fifth lens having positive refractive power with an object-side surface being convex; and
   a sixth lens having negative refractive power with an object-side surface being concave and an image-side surface being concave,
   wherein f*tan(Semi-FOV) >4.4 mm and_TTL*f/(ImgH*EPD)<2.7,
   where f is an effective focal length of the optical imaging system, Semi-FOV is half of a maximum field-of-view angle of the optical imaging system, TTL is a distance along the optical axis from an object-side surface of the first lens to an imaging plane of the optical imaging system, ImgH is half of a diagonal length of an effective pixel region on the imaging plane, and EPD is an entrance pupil diameter of the optical imaging system; and
   wherein 1<f5/f<1.3,
   where f5 is an effective focal length of the fifth lens, and f is the effective focal length of the optical imaging system.

2. The optical imaging system according to claim 1, wherein −0.6<SAG21/T12<3.6,
   where SAG21 is an on-axis distance between an intersection point of an object-side surface of the second lens and the optical axis to a vertex of an effective radius of the object-side surface of the second lens, and T12 is a spaced interval between the first lens and the second lens along the optical axis.

3. The optical imaging system according to claim 1, wherein 1.8<T56/CT6 <2.2,
   where T56 is a spaced interval between the fifth lens and the sixth lens along the optical axis, and CT6 is a center thickness of the sixth lens along the optical axis.

4. The optical imaging system according to claim 1, wherein 0.4<f6/R11<0.8,
   where f6 is an effective focal length of the sixth lens, and R11 is a radius of curvature of the object-side surface of the sixth lens.

5. The optical imaging system according to claim 1, wherein 5.6 mm<f5<6.1 mm,
   where f5 is an effective focal length of the fifth lens.

6. The optical imaging system according to claim 1, wherein 0.2<f/(f1-f2)<0.5,
   where f is the effective focal length of the optical imaging system, f1 is an effective focal length of the first lens, and f2 is an effective focal length of the second lens.

7. The optical imaging system according to claim 1, wherein 0.3<R12/f<0.8,
   where R12 is a radius of curvature of the image-side surface of the sixth lens and f is the effective focal length of the optical imaging system.

8. The optical imaging system according to claim 1, wherein 0.3<(R9+R10)/(R9-R10)<0.9,
   where R9 is a radius of curvature of the object-side surface of the fifth lens, and R10 is a radius of curvature of an image-side surface of the fifth lens.

9. The optical imaging system according to claim 1, wherein the object-side surface of the first lens is convex and an image-side surface of the first lens is concave;
   an image-side surface of the second lens is concave; and
   an image-side surface of the fifth lens is convex.

10. An optical imaging system, sequentially from an object side to an image side of the optical imaging system along an optical axis, comprising:
    a first lens having positive refractive power;
    a second lens having negative refractive power;
    a third lens having refractive power with an object-side surface being concave and an image-side surface being convex;
    a fourth lens having refractive power;
    a fifth lens having positive refractive power with an object-side surface being convex; and
    a sixth lens having negative refractive power with an object-side surface being concave and an image-side surface being concave;
    wherein f*tan(Semi-FOV) >4.4 mm, and 1.5<T56/TTL*10<1.7,
    where f is an effective focal length of the optical imaging system, Semi-FOV is half of a maximum field-of-view angle of the optical imaging system, T56 is a spaced interval between the fifth lens and the sixth lens along the optical axis, and TTL is a distance along the optical axis from an object-side surface of the first lens to an imaging plane of the optical imaging system; and
wherein $1<f5/f<1.3$,
where f5 is an effective focal length of the fifth lens, and f is the effective focal length of the optical imaging system.

11. The optical imaging system according to claim 10, wherein $-0.6<SAG21/T12<3.6$,
where SAG21 is an on-axis distance between an intersection point of an object-side surface of the second lens and the optical axis to a vertex of an effective radius of the object-side surface of the second lens, and T12 is a spaced interval between the first lens and the second lens along the optical axis.

12. The optical imaging system according to claim 10, wherein $1.8<T56/CT6<2.2$,
where T56 is the spaced interval between the fifth lens and the sixth lens along the optical axis, and CT6 is a center thickness of the sixth lens along the optical axis.

13. The optical imaging system according to claim 10, wherein $0.4<f6/R11<0.8$,
where f6 is an effective focal length of the sixth lens, and R11 is a radius of curvature of the object-side surface of the sixth lens.

14. The optical imaging system according to claim 10, wherein 5.6 mm$<$f5$<$6.1 mm,
where f5 is an effective focal length of the fifth lens.

15. The optical imaging system according to claim 10, wherein $0.2<f/(f1-f2)<0.5$,
where f is the effective focal length of the optical imaging system, f1 is an effective focal length of the first lens, and f2 is an effective focal length of the second lens.

16. The optical imaging system according to claim 10, wherein $0.3<R12/f<0.8$,
where R12 is a radius of curvature of the image-side surface of the sixth lens and f is the effective focal length of the optical imaging system.

17. The optical imaging system according to claim 10, wherein $0.3<(R9+R10)/(R9-R10)<0.9$,
where R9 is a radius of curvature of the object-side surface of the fifth lens, and R10 is a radius of curvature of an image-side surface of the fifth lens.

18. The optical imaging system according to claim 10, wherein an object-side surface of the first lens is convex and an image-side surface of the first lens is concave,
an image-side surface of the second lens is concave, and an image-side surface of the fifth lens is convex.

* * * * *